(12) United States Patent
Bleyer et al.

(10) Patent No.: US 11,503,271 B2
(45) Date of Patent: Nov. 15, 2022

(54) ACTIVE STEREO MATCHING FOR DEPTH APPLICATIONS

(71) Applicant: MICROSOFT TECHNOLOGY LICENSING, LLC, Redmond, WA (US)

(72) Inventors: Michael Bleyer, Seattle, WA (US); Yuri Pekelny, Seattle, WA (US); Raymond Kirk Price, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/146,232

(22) Filed: Jan. 11, 2021

(65) Prior Publication Data

US 2021/0136347 A1    May 6, 2021

Related U.S. Application Data

(62) Division of application No. 15/928,868, filed on Mar. 22, 2018, now Pat. No. 10,944,957.

(51) Int. Cl.
*H04N 13/271* (2018.01)
*G06T 15/04* (2011.01)
*H04N 5/33* (2006.01)
*G06T 19/00* (2011.01)
*G06F 3/01* (2006.01)
(Continued)

(52) U.S. Cl.
CPC ........... *H04N 13/271* (2018.05); *G06F 3/012* (2013.01); *G06F 3/0346* (2013.01); *G06T 7/593* (2017.01); *G06T 15/04* (2013.01); *G06T 19/006* (2013.01); *G09G 3/025* (2013.01); *H04N 5/33* (2013.01); *H04N 13/239* (2018.05); *H04N 13/254* (2018.05); *G02B 2027/014* (2013.01); *G02B 2027/0138* (2013.01); *G06T 2207/10048* (2013.01); *H04N 2013/0081* (2013.01)

(58) Field of Classification Search
CPC ........... G06T 15/04; G06T 2207/10048; G06T 7/593; H04N 2013/0081
See application file for complete search history.

(56) References Cited

U.S. PATENT DOCUMENTS

| 10,248,842 B1* | 4/2019 | Bardagjy | G06V 40/174 |
| 2013/0076789 A1* | 3/2013 | Majumder | H04N 9/3194 382/294 |

(Continued)

OTHER PUBLICATIONS

"VisMerge: Light Adaptive Vision Augmentation via Spectral and Temporal Fusion of Non-visible Light"—Jason Orlosky, Peter Kim, Kiyoshi Kiyokawa, Tomohiro Mashita, Photchara Ratsamee, Yuki Uranishi, and Haruo Takemura; 2017 IEEE International Symposium on Mixed and Augmented Reality (Year: 2017).*

(Continued)

*Primary Examiner* — Mainul Hasan
(74) *Attorney, Agent, or Firm* — Workman Nydegger

(57) ABSTRACT

A head-mounted device (HMD) is configured to perform depth detection with a stereo camera pair comprising a first camera and a second camera, both of which are configured to detect/capture visible light and IR light. The fields of view for both of the cameras overlap to form an overlapping field of view. The HMD also includes an IR dot-pattern illuminator that is mounted on the HMD with the cameras and that is configured to emit an IR dot-pattern illumination. The IR dot-pattern illuminator emits a dot-pattern illumination that spans at least a part of the overlapping field of view. The IR dot-pattern illumination adds texture to objects in the environment and enables the HMD to determine depth for those objects, even if they have textureless/smooth surfaces.

19 Claims, 23 Drawing Sheets

(51) Int. Cl.
  *G06T 7/593*    (2017.01)
  *H04N 13/239*   (2018.01)
  *H04N 13/254*   (2018.01)
  *G06F 3/0346*   (2013.01)
  *G09G 3/02*     (2006.01)
  *H04N 13/00*    (2018.01)
  *G02B 27/01*    (2006.01)

(56) References Cited

U.S. PATENT DOCUMENTS

| | | | |
|---|---|---|---|
| 2015/0381972 A1* | 12/2015 | Kowdle | G01B 11/2513 |
| | | | 348/51 |
| 2016/0260251 A1* | 9/2016 | Stafford | G02B 27/0179 |
| 2016/0260260 A1* | 9/2016 | Fei | H04N 5/33 |
| 2017/0134717 A1* | 5/2017 | Trail | H04N 13/128 |
| 2017/0142314 A1* | 5/2017 | Moore | H04N 5/2256 |
| 2019/0072771 A1* | 3/2019 | Hall | G02B 27/0172 |
| 2019/0258058 A1* | 8/2019 | Fortin-Deschênes | G06F 3/011 |
| 2020/0139227 A1* | 5/2020 | Mikhailov | G09G 3/001 |

OTHER PUBLICATIONS

U.S. Appl. No. 15/928,868, filed Mar. 22, 2018.
U.S. Appl. No. 15/937,195, filed Mar. 27, 2018.
U.S. Appl. No. 15/928,787, filed Mar. 22, 2018.
U.S. Appl. No. 15/933,122, filed Mar. 22, 2018.
"Office Action Issued in European Patent Application No. 19715626.8", dated May 24, 2022, 7 Pages.

* cited by examiner

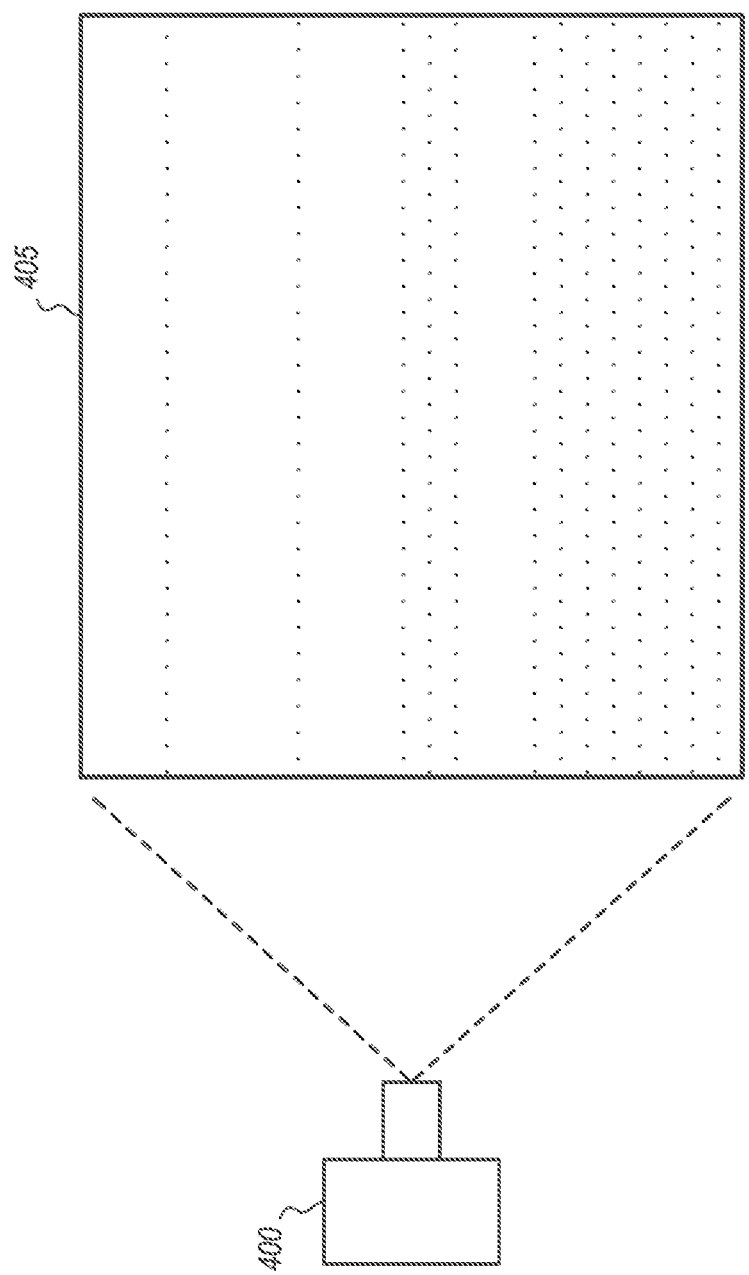

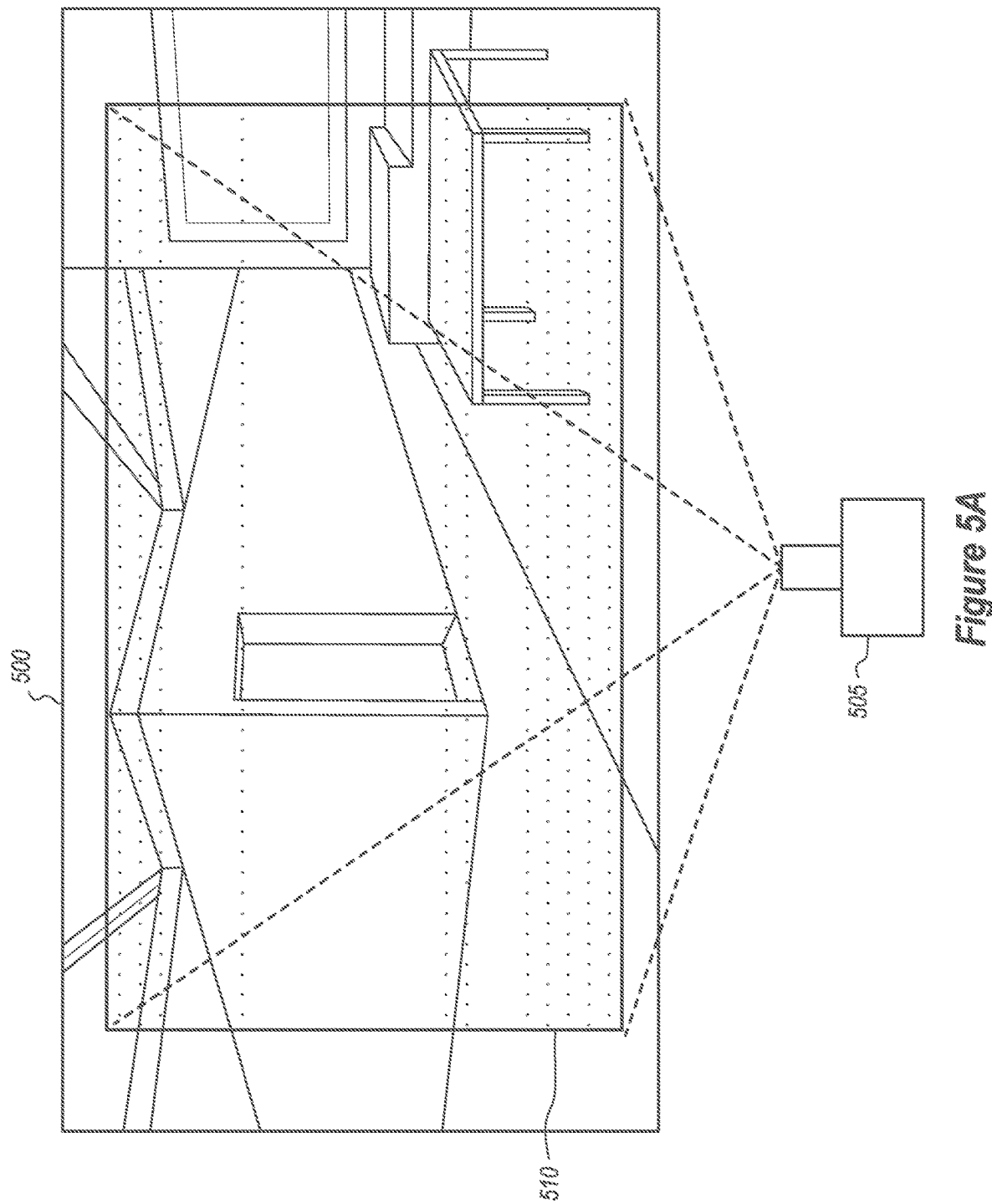

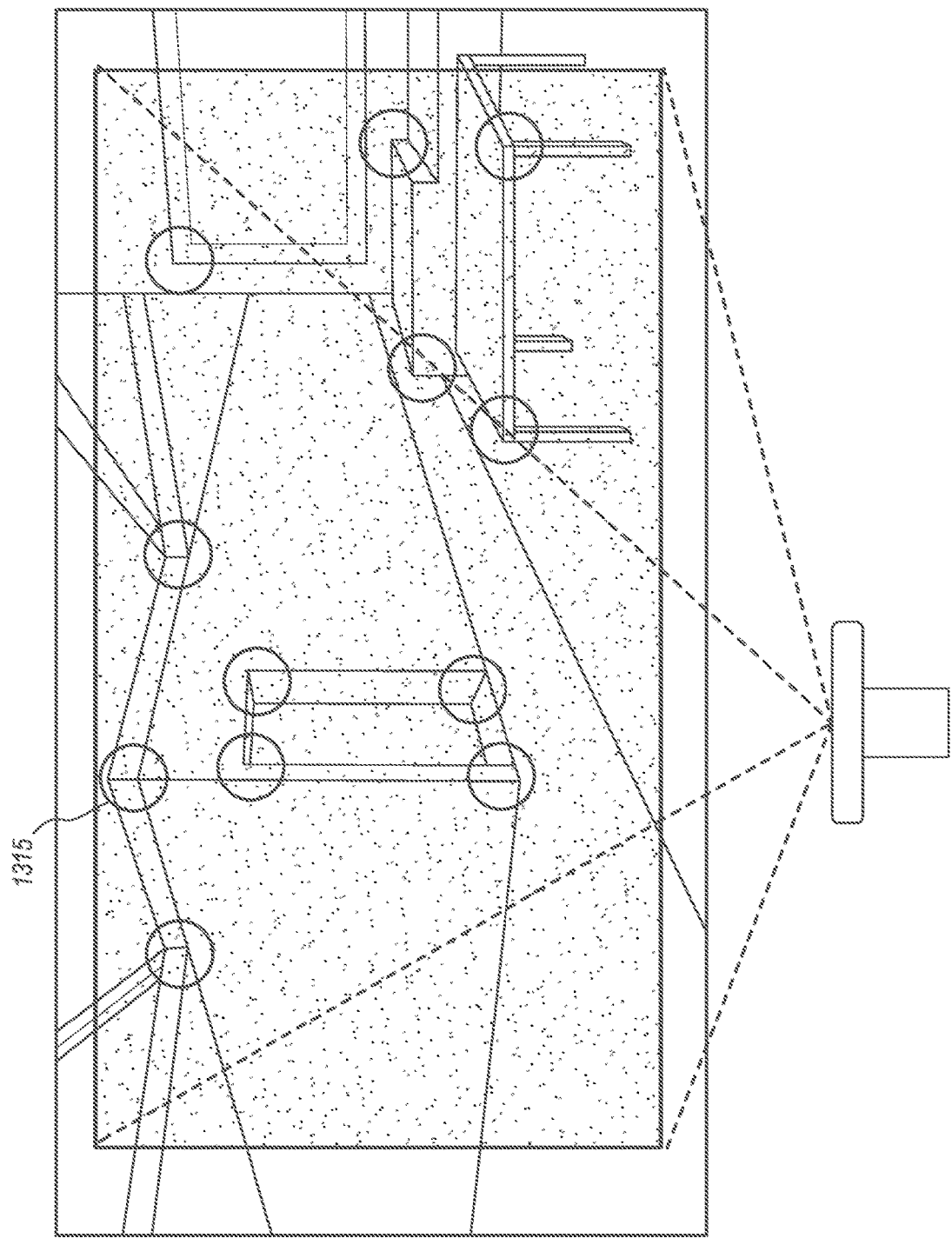

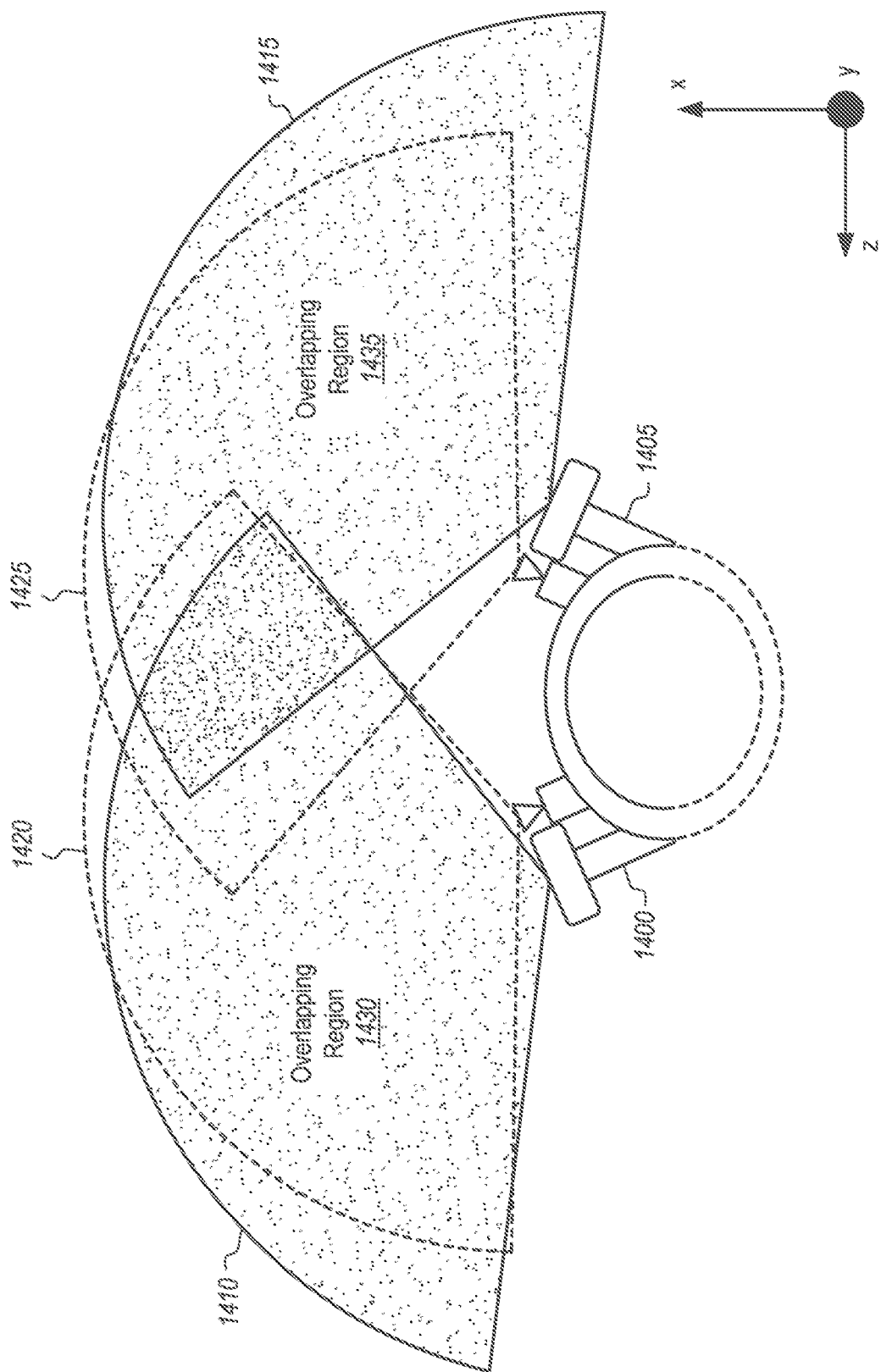

ACTIVE STEREO MATCHING FOR DEPTH APPLICATIONS

CROSS-REFERENCE TO RELATED APPLICATIONS

This application is a divisional of U.S. patent application Ser. No. 15/928,868 filed on Mar. 22, 2018, entitled "ACTIVE STEREO MATCHING FOR DEPTH APPLICATIONS," which issued as U.S. Pat. No. 10,944,957 on Mar. 9, 2021, and which application is expressly incorporated herein by reference in its entirety.

BACKGROUND

Mixed-reality systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

The disclosed mixed-reality systems use one or more on-body devices (e.g., the HMD, a handheld device, etc.). The HMD provides a display that enables a user to view overlapping and/or integrated visual information in whatever environment the user is in, be it a VR environment or an AR environment. By way of example, as shown in FIG. 1, a mixed-reality system may present virtual content to a user in the form of a simulated vase resting on a real table surface.

Continued advances in hardware capabilities and rendering technologies have greatly improved how mixed-reality systems render virtual objects. However, the process of immersing a user into a mixed-reality environment creates many challenges, difficulties, and costs, particularly with regard to determining three-dimensional spatial information around the user and tracking a user's movement so the visual display information can be correctly presented to the user.

For instance, by way of example, conventional HMD systems require separate/additional hardware for performing depth detection, from the hardware that is required to perform head tracking. This additional hardware adds to the overall cost, weight, battery consumption and size of the HMD systems.

Additionally, conventional passive stereo depth detection systems fail to adequately determine the depth of a textureless (aka smooth) surface (e.g., a wall) in a mixed-reality environment because those systems fail to adequately distinguish one part of the textureless/smooth surface from another part. As such, there is a substantial need to improve how depth is detected, especially for textureless/smooth surfaced objects in mixed-reality environments.

The subject matter claimed herein is not limited to embodiments that solve any disadvantages or that operate only in environments such as those described above. Rather, this background is provided only to illustrate one exemplary technology area where some embodiments described herein may be practiced.

BRIEF SUMMARY

Disclosed embodiments include methods and systems incorporating head-mounted devices (HMDs) with a stereo camera system in which the HMDs are configured to perform head tracking (i.e., detecting a user's movements and properly adjusting the display information to accommodate change in a user's position) and depth detection by generating 3D geometry mapping of the surrounding HMD environment. In some instances, the HMDs also incorporate one or more infrared (IR) light illuminators for illuminating IR pattern light and/or IR flood light to facilitate depth detection and/or tracking with the HMDs.

In some embodiments, the stereo camera system includes a first camera and second camera that are both able to detect visible light and infrared (IR) light. The cameras are mounted on the HMD in such a manner that they have a large field of view and are able to capture a large amount of area in the surrounding environment. At least some of the cameras' fields of view overlap with one another in an overlapping view region.

In some instances, the HMD includes an IR dot-pattern illuminator configured to emit an IR dot-pattern illumination that spans an illumination area. The IR dot-pattern illuminator is mounted on the HMD and is aimed in such a manner that the projected IR dot-pattern illumination overlaps with at least a part of the previously mentioned overlapping view region. Such a configuration is beneficial because it enables both cameras to simultaneously capture reflections from at least some of the same portions of the IR dot-pattern illumination as well as the visible light in the scene. In this manner, the IR dot-pattern illuminator adds "texture" (i.e., the IR dot-pattern illumination) to surfaces in the surrounding environment, adding an additional IR dot pattern to the visible light that is observed by the stereo camera system. By obtaining digital image content corresponding to this texture, the HMD is able to measure the 3D geometry of the surrounding scene, even for surfaces that are relatively textureless/smooth. Consequently, the disclosed embodiments are able to significantly improve how depth is detected.

In some embodiments, a predetermined texture is added to one or more objects in the HMD's environment with the IR dot-pattern illumination being projected into the overlapping region of the camera stereo pair, thus projecting the light onto one or more objects in the scene. Reflected IR light is then detected by the HMD's head tracking stereo camera pair. For reference, this reflected IR light is generated as a result of the IR dot-pattern illumination reflecting off of the object(s). Using the observed visible light and this reflected IR light, a stereoscopic depth for the object(s) is determined.

In some embodiments, an operation of geometric surface reconstruction is also performed in conjunction with a head tracking operation. These two distinct operations may be performed at different frequencies, yet by the same stereo camera pair. For example, at a first selected frequency, the stereo camera pair initially obtains visible light images of a surrounding environment for the purpose of head tracking. Subsequently, the visible light images of the surrounding environment are used to track a position of the HMD within that environment. Concurrently, at a second selected frequency, the IR dot-pattern illuminator is caused to emit an IR dot-pattern illumination onto the surrounding environment. Then, the stereo camera pair senses the visible light of the scene and at least some reflected IR light. This reflected IR light is generated as a result of the IR dot-pattern illumination reflecting off of at least a part of the environment. Subsequently, a depth map is generated or calculated using stereo depth imaging based on the visible and reflected IR light. Finally, geometric surfaces are constructed for the surrounding environment using the depth map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosed embodiments may be realized and obtained by means of the instruments and combinations particularly pointed out in the appended claims. Features of the disclosed embodiments will become more fully apparent from the following description and appended claims or may be learned by the practice of the embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 also illustrates a table and a virtual object (i.e., the vase) that are visible to the user of the HMD.

FIG. 4 shows an infrared (IR) dot-pattern illuminator and an IR dot-pattern illumination emitted by the IR dot-pattern illuminator.

FIG. 5A shows the IR dot-pattern illumination projected into a HMD's surrounding environment.

FIG. 6A shows an environment as viewed in the visible light spectrum where two objects are present while

FIGS. 13A and 13B show how a flood IR illuminator may be used to project a flood of IR light onto an environment in order to detect anchor points in a low light environment.

FIG. 14 shows an example configuration of the regions of IR light associated with flood IR illuminators mounted on a HMD, as well as the fields of view of the stereo cameras mounted on the HMD.

DETAILED DESCRIPTION

Figure 1:
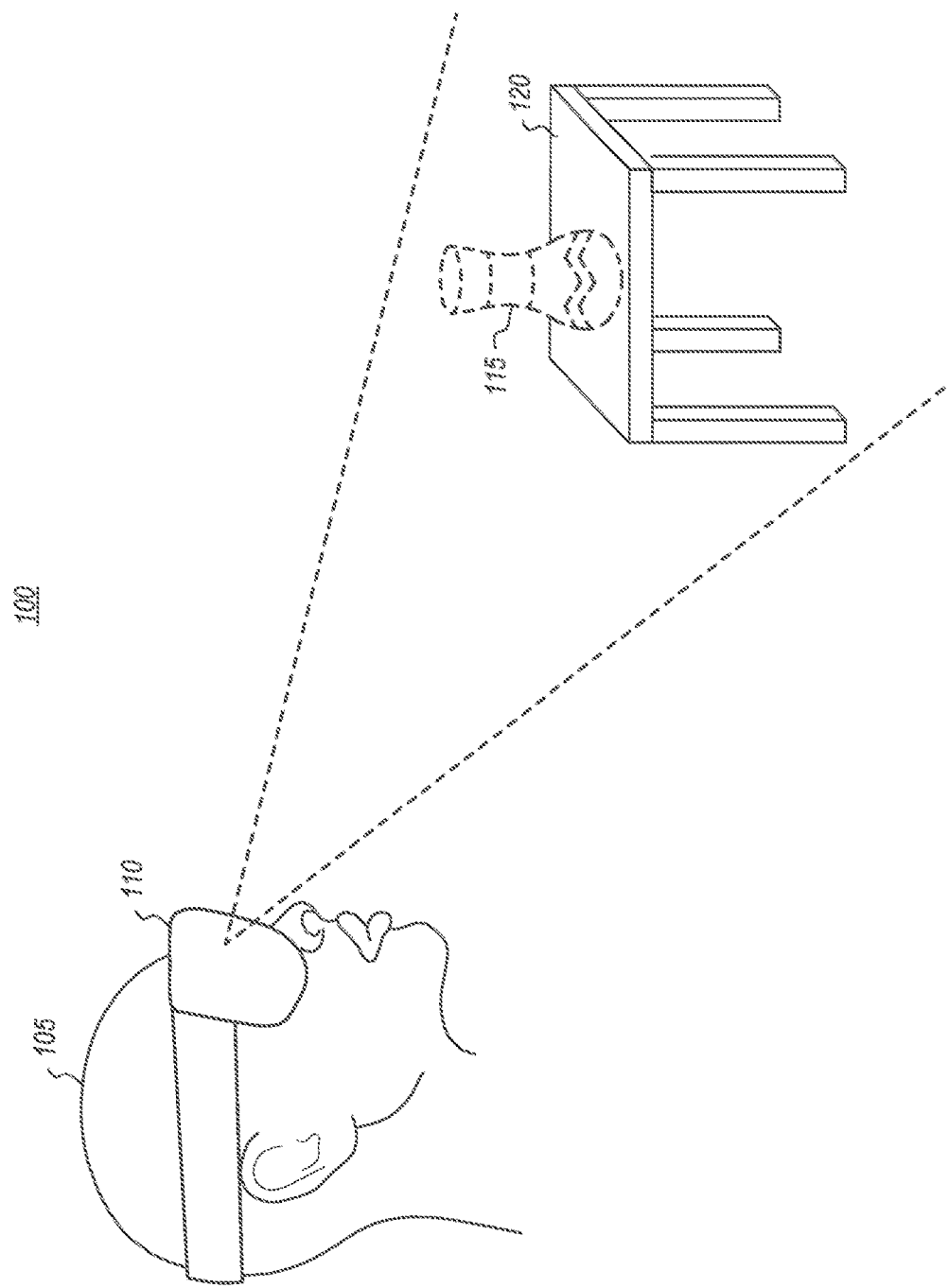
FIG. 1 shows a head-mounted device (HMD) structured to identify its location and orientation with respect to its surrounding environment (i.e., motion detection) as well as to determine the depth of an object in that environment.

At least some of the embodiments described herein relate to head-mounted devices (HMDs) configured to perform depth detection by generating a 3D geometry mapping of the surrounding environment. As an initial matter, the HMD may include a stereo camera pair comprising a first and second camera. Both cameras are mounted on the HMD, and both are able to detect visible light and infrared (IR) light. Such positioning is beneficial for motion tracking purposes because it allows the cameras to capture a large amount of area in the surrounding environment. By capturing more area, the HMD is better able to track movements. Furthermore, at least a part of the cameras' fields of view overlap with one another (i.e., an overlapping field of view region).

The HMD also includes one (or more) IR dot-pattern illuminators. The IR dot-pattern illuminator is configured to emit an IR dot-pattern illumination that spans an illumination area. The IR dot-pattern illuminator is mounted on the HMD and is aimed in a particular manner. Specifically, when it projects the IR dot-pattern illumination, at least a part of the illumination area overlaps at least a part of the previously mentioned overlapping field of view region. Such a configuration is beneficial for enabling both cameras of the stereo camera system to simultaneously capture the reflections of the IR dot-pattern illumination that reflect off of the same object(s) in the surrounding environment. By obtaining digital image content corresponding to this IR dot-pattern texturing, the HMD is able to improve the quality of the calculated 3D geometry of the surrounding environment. This improvement is significant for textureless/smooth surfaces with low texture. In this manner, the disclosed embodiments can be used to significantly improve depth detection, particularly when using HMD systems.

In some embodiments, predetermined texturing is added to one or more objects in the HMD's environment with an IR dot-pattern illuminator. A combination of the reflected IR and visible light is then detected by the HMD's head tracking stereo camera pair as a result of the IR dot-pattern illumination reflecting off of the object(s). This reflected IR light is then processed for determining the stereoscopic depth(s) for each object.

In some instances, an operation of geometric surface reconstruction is performed in conjunction with an operation of head tracking. These two operations may be performed at different frequencies. For example, at a first selected frequency, the head tracking stereo camera pair initially obtains visible light images of a surrounding environment. Using those images, the HMD is able to identify a number of target references (e.g., anchor points). These anchor points help track the HMD's position and orientation in relation to the surrounding environment. Subsequently, the visible light images of the surrounding environment are used to track a position of the HMD within that environment. At a second selected frequency, the IR dot-pattern illuminator is caused to emit an IR dot-pattern illumination onto the surrounding environment. Then, the head tracking stereo camera pair senses at least some reflected IR light and a portion of the visible light in the scene. Subsequently, a depth map is calculated using stereo matching between the left and right camera images. The addition of the IR light pattern allows for improved stereo matching and depth map calculation. Finally, geometric surfaces are constructed for the surrounding environment using the depth map.

It will be appreciated that the disclosed embodiments provide significant improvements over how passive stereo depth sensing camera systems on HMDs perform depth detection, particularly for detecting the depth of objects having textureless/smooth surfaces. In particular, in at least some instances, the disclosed embodiments provide improvements for determining depth of objects within the environment surrounding a HMD, even objects having textureless/smooth surfaces. This is accomplished, for example, by using the HMD to apply and sense IR dot-pattern texturing applied to the surfaces of the objects in the environment surrounding the HMD. This IR dot-pattern beneficially augments any detected visible light when performing depth detection. In this manner, it is possible to clearly and accurately determine any object's depth, even when that object has textureless/smooth surfaces.

Additionally, the present embodiments repurpose some of the hardware used to perform head tracking (i.e., the stereo camera system) to additionally perform depth detection, and thereby eliminating some of the undesired costs, weight, battery consumption and size of the HMD systems that perform both head tracking and depth detection. In some embodiments, the head tracking cameras are tilted to provide a wide field of view (FOV), which benefits head tracking and which provides a stereo overlap region, which is used to perform depth calculations.

Having just described some of the various high-level features and benefits of the disclosed embodiments, attention will now be directed to FIGS. 1 through 12. These figures illustrate various architectures, methods, and supporting illustrations related to adding texture to a surface to better determine that surface's depth. Following that discussion, the disclosure will turn to FIGS. 13A through 17. These figures present various architectures, methods, and supporting illustrations related to projecting a flood of IR light into an environment to better perform movement detection (including head movements, hand movements, hand-held device movements, etc.). Performing this movement detection may be performed in any kind of environment, even in a low light environment. Subsequently, the disclosure will focus on FIGS. 18 through 20. These figures demonstrate a hybrid approach for performing movement detection in conjunction with depth detection. At the end, the disclosure will turn to FIG. 21, which presents an example computer system that may be used to facilitate the disclosed principles.

Improved Methodologies for Determining Depth

Attention is now directed to FIG. 1, which illustrates an example environment 100 of a user 105 using an HMD 110. The HMD 110 is an example of a mixed-reality system that is able to render virtual content for the user 105. As previously noted, the HMD 110 may be a VR system or an AR system, such that environment 100 may be a VR environment or an AR environment. The term environment, mixed-reality environment and surrounding environment will be used interchangeably herein to refer to environment 100 and other HMD environments referenced herein.

In world-locked holograms/mixed-reality environments (aka world-stabilized imaging), a user may experience discomfort when his/her head movement is not matched to what is visually displayed. Therefore, it is desirable to provide the user 105 with as pleasant an experience as possible while the user 105 is wearing the HMD 110 by determining the user's position in relation to the various objects in the environment 100 (i.e., to perform depth detection and head tracking).

In FIG. 1, the environment 100 is shown as including a first object 115 and a second object 120. To obtain an accurate mapping of the real objects in the scene (aka mixed-reality environment), it is beneficial to know how far away these objects are from the user 105 at any given moment. By following the principles disclosed herein, significant advantages are realized because highly accurate depth determinations may be performed. By performing these depth determinations, the mixed-reality environment, which is created by the HMD 110, can accurately place virtual objects that interact with the real world. This results in a more life-like interaction of virtual and real world objects, and the user 105's experience will be significantly improved.

Figure 2:
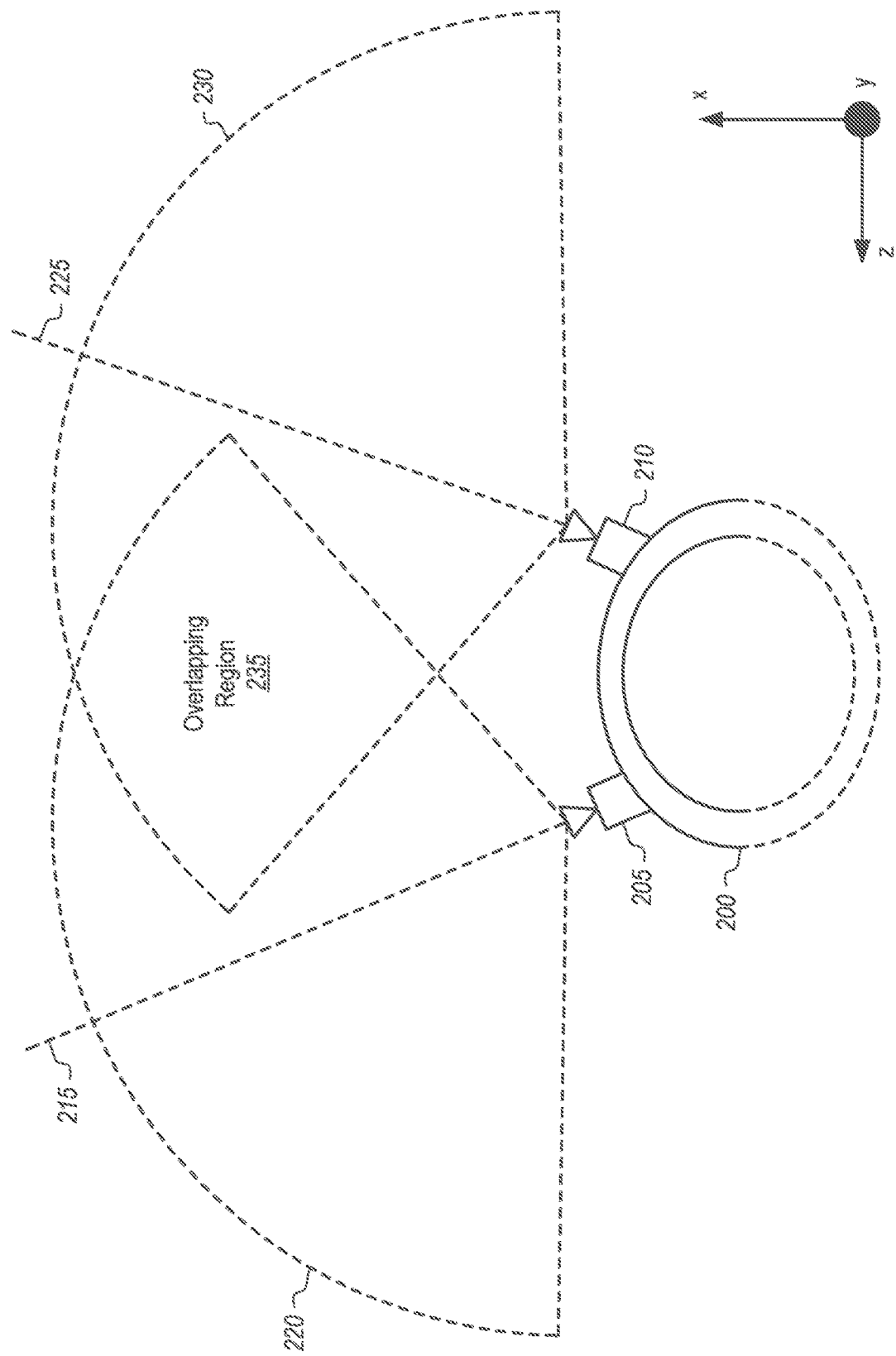
FIG. 2 illustrates an HMD that includes a stereo camera pair which can be used to perform motion detection and which can also be used to perform depth detection using an overlapping field of view region existing between the two cameras' fields of view.

FIG. 2 shows an HMD 200 that is specially configured to perform advanced depth determinations in addition to rendering mixed-reality environments. For reference, this HMD 200 is one example implementation of the HMD 110 from FIG. 1. FIG. 2 is illustrated from a top perspective, looking down at the HMD 200, as indicated by the "x, y, z" direction legend.

As shown, HMD 200 includes a head-tracking stereo camera pair which includes at least two cameras, namely camera 205 and camera 210, both of which are mounted on the HMD 200. According to the disclosed embodiments, the head tracking stereo camera pair may be used for multiple different operations, including, but not limited to, capturing images for tracking the movements of the HMD 200, as well as capturing images for determining depth.

Although HMD 200 is shown as including only two cameras, the HMD 200 may actually include any number of cameras. For instance, the HMD 200 may include 3 cameras, 4 cameras or more than four cameras. As such, the HMD 200 is not limited only to two cameras.

Camera 205 is shown as including an optical axis 215. For reference, a camera's optical axis is an imaginary "line" that passes through the direct center of the camera's lens. As a practical example, an optical axis is akin to the point where the camera is being aimed. In addition to the optical axis 215, FIG. 2 also shows that camera 205 has a field of view 220. In some implementations, camera 205 includes a wide-angle lens such that the field of view 220 is also a wide-angle field of view. This wide-angle field of view may span a range anywhere from 45 degrees up to 180 degrees horizontally (in ultra-wide-angle cameras) and anywhere from 45 degrees up to 120 degrees vertically.

Camera 210 may be configured similarly to camera 205. For instance, camera 210 similarly includes an optical axis 225 and a field of view 230. By combining the fields of view of the two cameras, a very large spanning area (e.g., 170 degrees, 180 degrees, etc.) around the HMD may be captured.

These cameras may be configured in many different ways. For example, in some implementations, both of the cameras 205 and 210 are configured as global shutter cameras. In other implementations, however, the cameras 205 and 210 are configured as rolling shutter cameras. Of course, combinations of global shutter and rolling shutter cameras may also be used. As an example, the camera 205 may be a global shutter camera while the camera 210 may be a rolling shutter camera. In a preferred embodiment, a global shutter camera is used because rolling shutter cameras are more prone to motion blur. Of course, the HMD 200 may have many cameras, some of which are global shutter and some of which are rolling shutter.

In some implementations, the cameras 205 and 210 (and in particular the pixels of these cameras) may be configured to detect, or rather be sensitive to, different spectrums of light (e.g., visible light and infrared (IR) light). For reference, the visible light spectrum ranges anywhere from around 380 nanometers (nm) up to and including about 740 nm. More specifically, violet light ranges from 380 nm to 435 nm. Blue light ranges from 435 nm to 500 nm. Green light ranges from 500 nm to 520 nm. Yellow light ranges from 565 nm to 590 nm. Red light ranges from 625 nm to 740 nm.

In contrast to visible light, infrared (IR) light is invisible to a human's eye and has a wavelength that is longer than the wavelengths for visible light. The infrared light spectrum starts at the trailing edge of the red light spectrum, around 700 nm, and extends to at least 1 um in length.

With that said, cameras 205 and 210 (at a pixel level) are configured to detect both visible light and IR light. In some instances, one or more of the cameras 205 and 210 are monochromatic cameras (i.e., greyscale). In some instances, one or more of the cameras 205 and 210 are chromatic cameras.

Of course, the cameras 205 and 210 may also be configured to detect only portions of the visible light spectrum and portions of the IR light spectrum. This may be achieved through the use of one or more optical bandpass filters in the lens. For brevity, the remaining disclosure will simply use the singular form of the term bandpass filter even though each camera may be configured with its own similarly configured or uniquely different bandpass filter.

The bandpass filter is configured, in some instances, to allow only a selected range of visible light to pass through and be detected by one or more corresponding camera(s) and while also allowing some or all IR light to also be detected by the same camera(s). Additionally, or alternatively, the bandpass filter may be configured to allow only a selected range of IR light to pass through and be detected by the one or more corresponding camera(s) while allowing some or all visible light to pass through and be detected by the same camera(s).

By way of example, the bandpass filter is configured in some embodiments to pass visible light having wavelengths between approximately 400 nm up to approximately 700 nm. In some embodiments, the bandpass filter is also specifically configured to pass IR light having wavelengths corresponding to the same wavelengths of IR light emitted by an IR laser mounted on the HMD 200 (to be discussed in more detail later). One example of the IR laser's wavelength may be approximately 850 nm. As such, the bandpass filter may pass IR light having wavelengths within a threshold value of the IR laser's wavelengths (e.g., within 10 nm, 20 nm, 30 nm, 40 nm, 50 nm, etc. of the emitted IR wavelength) while not passing other IR light wavelengths.

In view of the foregoing, it will be appreciated that one or both cameras 205 and 210 may include a bandpass filter that allows at least some visible light to pass through the bandpass filter (while potentially filtering out some visible light) and at least some IR light to pass through the bandpass filter (while potentially filtering out some IR light). Likewise, in some implementations, camera 205 and/or camera 210 may also omit any IR light filter.

FIG. 2 also shows how the cameras 205 and 210 may be positioned in relation to each other on the HMD 200. For example, at least a part of the field of view 220 of camera 205 is shown as overlapping at least a part of the field of view 230 of camera 210 thus forming the overlapping region 235 (aka an "overlapping field of view region"). This overlapping region 235 is beneficial for a number of reasons, which will be discussed later.

In some configurations, the cameras may be horizontally offset (e.g., offset relative to a horizontal alignment of the HMD 200 in the y-direction plane). For instance, camera 205 may be pointed slightly downward or upward in the y-direction while camera 210 may be aligned with the horizontal plane (e.g., y-direction). In this manner, the camera 205 may have a y-angle offset in relation to the horizontal alignment of the HMD 200. Relatedly, the camera 210 may be pointed slightly downward or upward in the y-direction relative to camera 205, while camera 205 is aligned with the y-direction horizontal plane. Of course, combinations of the above are also available. For instance, camera 205 may be pointed slightly downward relative to the horizontal plane and camera 210 may be pointed slightly upward relative to the horizontal plane, and vice versa. Alternatively, cameras 205 and 210 are horizontally aligned, such that they do not have any y-angle offset and such that they are pointed directionally level in the y-direction.

Additionally, or alternatively, to the above horizontal alignments/offsets, cameras 205 and 210 may also be aligned/offset in other directions. For instance, FIG. 2 shows that the optical axis 215 of camera 205 is angled (i.e., non-parallel) in relation to the optical axis 225 of camera 210 in the x-direction. Such a configuration is sometimes beneficial because it allows the cameras 205 and 210 to capture a larger area of the surrounding environment, thus providing more reference area when performing movement detection (e.g., head tracking). This angle offset may be any selected angle. Example angles include, but are not limited to 5 degrees, 10, 15, 20, 25, 30, 35, 40, 45, 50, 55, 60, 65, 70, 75, 80, 85 degrees, and so on.

Although FIG. 2 and the remaining figures show the cameras 205 and 210 angled in relation to one another, the embodiments should not be limited to such a configuration. In fact, in some instances, the optical axes 215 and 225 are aligned in parallel with one another in the x direction. In any event, and regardless of which orientation is used, the disclosed embodiments advantageously create overlapping region 235 with the fields of view 220 and 230.

Yet another configuration is available for the cameras 205 and 210. To illustrate, the vertical positions of the cameras 205 and 210 (i.e., the relative height of the cameras along the y-direction on the HMD 200) may also vary. As an example, camera 205 may be positioned below camera 210 on the HMD 200. Alternatively, camera 210 may be positioned below camera 205 on the HMD 200. Otherwise, the cameras 205 and 210 are mounted at the same relative height/vertical position on the HMD 200. Accordingly, from this disclosure, it is clear that the positions and orientations of the cameras 205 and 210 may vary widely.

Now that the configurations for the cameras 205 and 210 have been introduced, the disclosure will turn to how these cameras 205 and 210 may operate. Recall, the stereo camera system/pair (i.e., cameras 205 and 210) are configured to detect light for performing movement detection (e.g., head tracking, hand tracking, object tracking, etc.), as well as depth detection. With regard to head tracking, the stereo camera pair actually constitutes an "inside-out" head tracking system because the stereo camera pair is mounted on the HMD 200.

An "inside-out" head tracking system tracks the position of an HMD (e.g., HMD 200) by monitoring the HMD's position in relation to its surrounding environment. This is accomplished through the use of tracking cameras (e.g., cameras 205 and 210) that are mounted on the HMD itself and that are pointed away from the HMD. In contrast, an "outside-in" tracking system uses cameras or external light illuminators that are mounted in the environment and that are pointed toward the HMD. In this manner, inside-out head tracking systems are distinguished from outside-in head tracking systems.

As shown, cameras 205 and 210 are mounted on the HMD 200 (i.e., the object being tracked) and may be (but are not required to be) slightly oriented away from each other (as shown by the angled orientation of the optical axes 215 and 225). Stated differently, the optical axis 215 is angled in relation to the optical axis 225.

To capture as much of the surrounding environment as possible, camera 205 and camera 210 may be positioned apart, at a preselected distance from each other, and may be angled away from each other. This preselected distance is referred to as a "baseline," and it may be any distance. Commonly, however, the baseline will range anywhere between at least 4 centimeters (cm) up to and including 16 cm (e.g., 4.0 cm, 4.1 cm, 4.2 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, 10.5 cm, 11.0 cm, 11.5 cm, 12.0 cm, 12.5 cm, 13.0 cm, 13.5 cm, 14.0 cm, 14.5 cm, 15.0 cm, 15.5 cm, 16.0 cm, or more than 16.0 cm or less than 4.0 cm.). Often, the baseline is at least 10 centimeters. Sometimes, the baseline is chosen to match the most common interpupil distance for humans, which is typically between 5.8 cm and 7.2 cm. In general, a wider baseline allows for accurate depth from stereo for an increased distance over narrower baseline designs. Other factors that may influence the accuracy of the camera system are the cameras' fields of view and their image resolution.

With the foregoing configuration, the stereo camera system is enabled to capture a large area of the surrounding environment, thus enabling the HMD 200 to interpolate its own position in relation to that environment. In addition to performing head tracking, the HMD 200 (and specifically the stereo camera pair along with the stereo camera pair's logical components) may be re-purposed, or rather multi-purposed, to also perform an improved form of depth detection. By re-purposing existing hardware components, the embodiments significantly reduce the cost for performing depth detection, especially when compared to time-of-flight depth detection systems.

As an initial matter, it is noted that humans are able to perceive "depth" because humans have a pair of eyes that work in tandem. When both eyes are focused on an object, signals from the eyes are transmitted to the brain. The brain is then able to interpolate depth using any disparity existing between the information captured from the two eyes.

Similar to how a human's eyes "focus" on an object when determining depth, the HMD 200 also obtains "focused" digital image content to determine depth. Here, the "focused" digital image content is obtained from camera images that include content corresponding to the overlapping region 235 (i.e., camera 205's image and camera 210's image, both of which include digital content corresponding to the overlapping region 235). In this manner, the cameras 205 and 210 obtain separate images, but these images still have at least some similar content.

Here, an example will be helpful. Suppose a table was located in the HMD 200's environment and that the HMD 200 was positioned so that the table was located within the overlapping region 235. In this scenario, cameras 205 and 210 are each able to obtain a digital image that includes digital content corresponding to the table. Consequently, at least some of the pixels in the image obtained by camera 205 will correspond to at least some of the pixels in the image obtained by camera 210. Specifically, these "corresponding pixels" (i.e., the pixels in the one image that correspond to the pixels in the other image) are associated with the table.

Once these digital images are obtained, then the HMD 200 performs certain transformations (also called "re-projections") on those digital images. These transformations correct for lens distortion and other camera artifacts. Furthermore, the stereo images are re-projected onto a virtual stereo rig where both image planes lie inside a plane that is parallel to the stereo cameras' baseline. After re-projection, corresponding pixels are guaranteed to lie on the same horizontal scanline in left and right images. As a result, two "re-projected" images are formed, one for the image that was obtained by the camera 205 and one for the image that was obtained by the camera 210. Any pixels that are similar/correspond between the two re-projected images now lie on the same horizontal plain.

After the re-projected images are created, the HMD 200 measures any pixel disparity that exists between each of the corresponding pixels in the two images. Because the HMD 200 understands that the corresponding pixels in the two re-projected images are now in the same horizontal plain, the HMD 200 identifies that the disparity between these corresponding pixels corresponds (i.e., is proportional) with a depth measurement. Using this disparity, the HMD 200 assigns a depth value to each pixel, thus generating a depth map for any objects located in the overlapping region 235. Accordingly, the HMD 200, through the use of its multi-purposed head-tracking stereo camera pair, is able to perform both movement detection as well as depth detection.

The remaining portion of this disclosure uses many examples of cameras and head tracking stereo camera pairs (or simply stereo camera pairs). Unless stated otherwise, these cameras may be configured with any of the positional/alignment configurations discussed above. Therefore, regardless of whether the system is performing head tracking or depth detection, any of the cameras mentioned above, operating in any of the configurations mentioned above, may be used.

Figure 3:
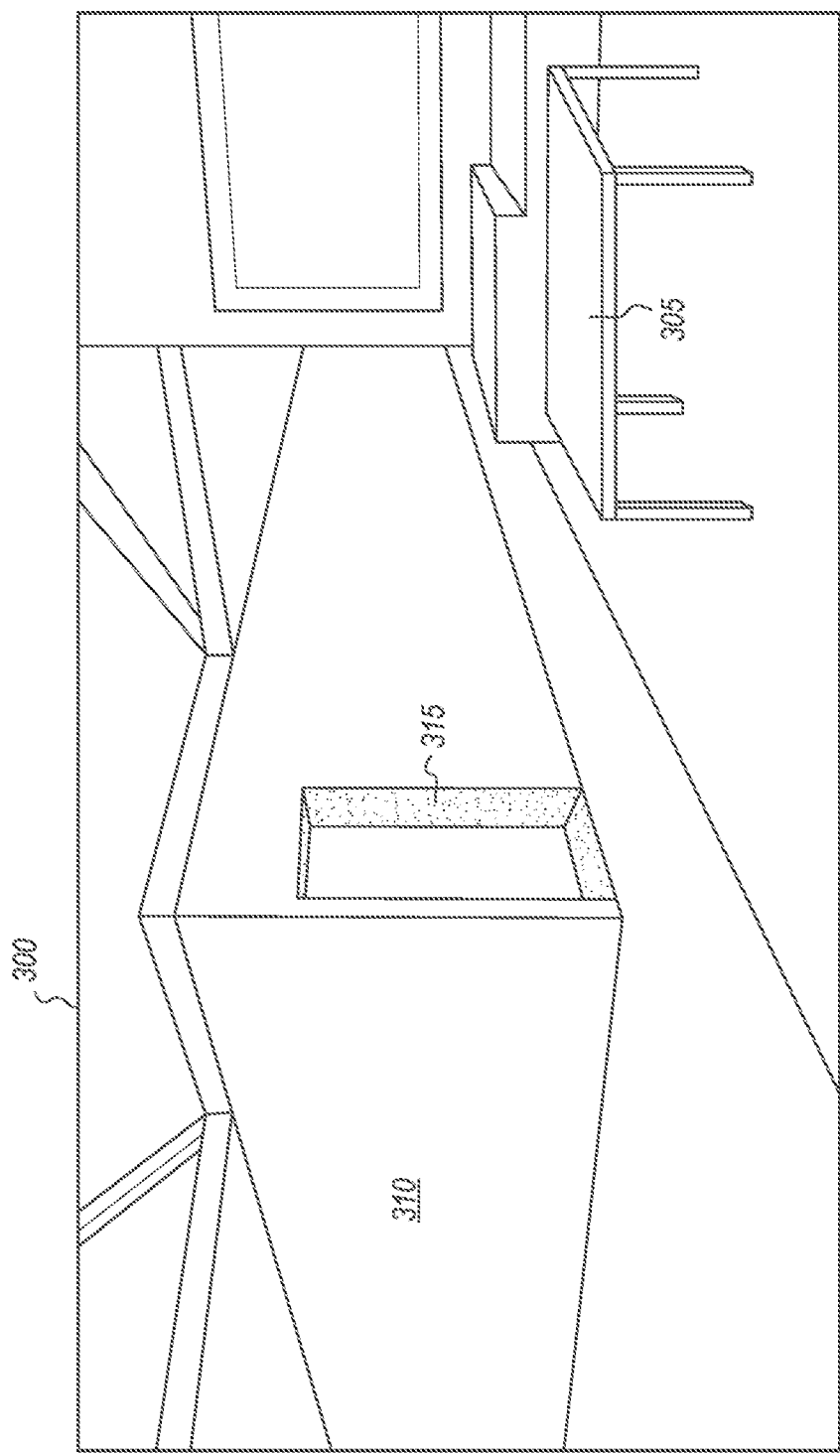
FIG. 3 shows an example environment in which the HMD may be used, and this example environment includes some objects that have textureless/smooth surfaces.

With that understanding, attention will now be directed to FIG. 3. In this illustration, an example environment 300 is provided, which may be presented to a user (e.g., user 105 from FIG. 1) who is using an HMD (e.g., HMD 110 from FIG. 1 or HMD 200 from FIG. 2) to visualize a mixed-reality environment.

Environment 300 includes a number of different features and objects. For example, environment 300 includes a textureless/smooth tabletop 305, a textureless/smooth wall 310, and a textured door frame 315, just to name a few. Of course, this is just one example of what an environment may look like, and thus should not be considered limiting or otherwise binding.

One problem that conventional depth perception systems have faced is determining depth for "textureless/smooth" objects (e.g., the textureless/smooth tabletop 305 and the textureless/smooth wall 310). For textured surfaces, like the textured door frame 315, traditional depth detection systems are usually able to capture enough details to perform the stereo matching between the left and right cameras to adequately gauge the depth of those textured objects. Unfortunately, however, traditional depth detection systems are very inadequate in determining the depth of textureless/smooth objects. In particular, traditional depth detection systems cannot collect enough information to adequately distinguish one part of the textureless/smooth object from another part, which may be further away.

For instance, if a user were to stand near the textureless/smooth tabletop 305, portions of the textureless/smooth wall 310 will be significantly closer than other portions of the textureless/smooth wall 310. However, traditional systems are unable to account for this change in depth because of a lack of texture on the surfaces and, hence a lack of reflected light that is used to determine the depth. As a result, traditional systems will often generate a false or otherwise misleading depth map for textureless/smooth objects like textureless/smooth wall 310. If any virtual content is dependent on that false depth map, then clearly the mixed-reality environment will be skewed and thus the user's experience will be hampered.

To address the above problems, some of the disclosed embodiments beneficially project, or rather add, texture to the environment. In some implementations, this texture is in the form of an infrared (IR) dot-pattern illumination. Because the HMD's stereo camera pair (e.g., camera 205 and 210 from FIG. 2) is sensitive to both visible and infrared (IR) light, the stereo camera pair is able to detect the added texture and compute proper depth for any kind of object, even a textureless/smooth object. The HMD is thereby provided a picture with structured light, thus improving depth quality determinations.

Attention is now directed to FIG. 4. In this illustration, an IR dot-pattern illuminator 400 projects/disperses IR light as an IR dot-pattern illumination 405. This IR dot-pattern illumination 405 may be projected to any predetermined illumination area within the HMD surrounding environment (e.g., any area in the environment 300 from FIG. 3).

Although, FIG. 4 only shows a single IR dot-pattern illuminator 400 being used to project the IR dot-pattern illumination 405, it will be appreciated that the IR dot-pattern illuminator may actually comprise two or more IR dot-pattern illuminators, (not shown), and which are mounted on the HMD. It will also be appreciated that the IR dot-pattern illuminator 400 may also include any combination of IR light emitting diode (LED), LED array, IR laser diode, incandescent discharge illuminator, vertical-cavity surface-emitting laser (VCSEL) and/or plasma discharge illuminator.

The IR dot-pattern illumination 405 may be generated in various ways. For instance, in a preferred embodiment, the IR dot-pattern illumination 405 is generated using a diffraction limited laser beam, a collimating optic, and a diffractive optical element (DOE). As such, the IR dot-pattern illuminator 400 may also include a collimating optic and a DOE to provide the desired projection/dispersion of the IR dot-pattern illumination 405. When an IR laser shoots a diffraction limited laser beam of IR light into the DOE, then the DOE disperses the IR light in such a manner so as to project the pre-configured dot pattern illumination. Other IR LED, incandescent discharge illuminator, VCSEL, plasma discharge illuminator, etc., may be used with more traditional imaging and re-projection techniques as well.

In an alternative embodiment, an etched lens may also be placed over top of an IR optical source/illuminator. In a first example, individual dots may be etched onto the lens to create the dot pattern. When the dot-pattern illuminator 400's IR laser emits a beam of IR light through this type of lens, the IR light unimpededly passes through the lens in the areas that were not etched. However, for the dot areas that were etched, the IR light may be impeded in accordance with the etched pattern, thus projecting a dot pattern into the surrounding environment.

In a second example, large swatches may be etched onto the lens while avoiding small "dot" areas that correspond to the dot pattern. When the IR laser emits a beam of IR light through this type of lens, only IR light that passes through the small unetched "dot" areas will pass unimpededly, thus projecting a dot pattern into the surrounding environment. Any other technique for generating a dot pattern may also be used (e.g., instead of etching the lens, a dot-pattern covering may be placed on the lens). Additionally, any other DOE may be used to disperse IR light in accordance with a pre-configured dot pattern. Regardless of its implementation, a beam of IR light is dispersed according to a predetermined dot-pattern.

While the disclosure has used the phrase "dot pattern," it will be appreciated that the term "dot" does not limit the illuminations to a circular shape. In fact, any shape of dot may be projected in the predetermined dot-pattern. For example, the dot pattern may include a pattern of circles, triangles, squares, rectangles and/or any other polygon or oval shaped dot(s).

It will also be appreciated that any kind of dot "pattern" may be used. For instance, the pattern may be a completely random assortment of dots. Alternatively, the pattern may include a pre-configured pattern that repeats itself in a horizontal and/or vertical direction. By repeating the dot pattern at least in the vertical direction, advantages are realized because the accuracy of the stereo matching algorithm will be improved. Even further, the size of the dots may also vary such that some dots may be larger or smaller than other dots to facilitate pattern matching.

Figure 5B:
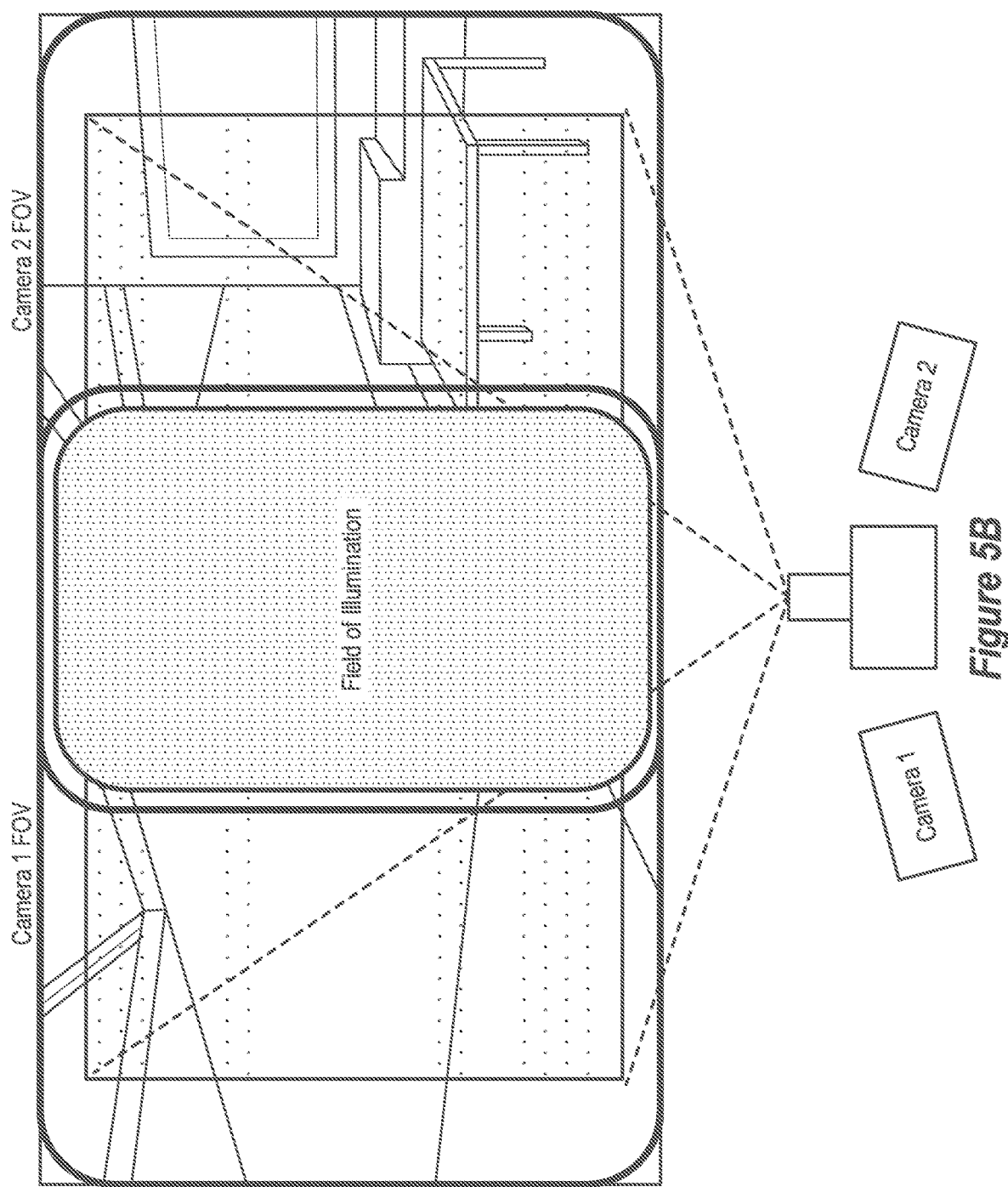
FIG. 5B shows an example of how the cameras may be oriented in relation to the IR dot-pattern illuminator and their overlapping fields of view.

As described herein, the IR dot-pattern illumination 405 is projected into the surrounding environment of a HMD in order to project, or rather add, "texture" to object surfaces in the surrounding environment. For instance, FIG. 5A shows an example environment 500 in which IR dot-pattern illuminator 505 is projecting an IR dot-pattern illumination 510 onto at least a part of the environment 500. As such, this IR dot-pattern illumination 510 is adding artificial texture to the objects in the environment 500. FIG. 5B shows how the cameras may be oriented in relation to the IR dot-pattern illuminator and how the cameras' fields of view overlap, which will be discussed in more detail in connection with FIG. 8.

Figure 6B:
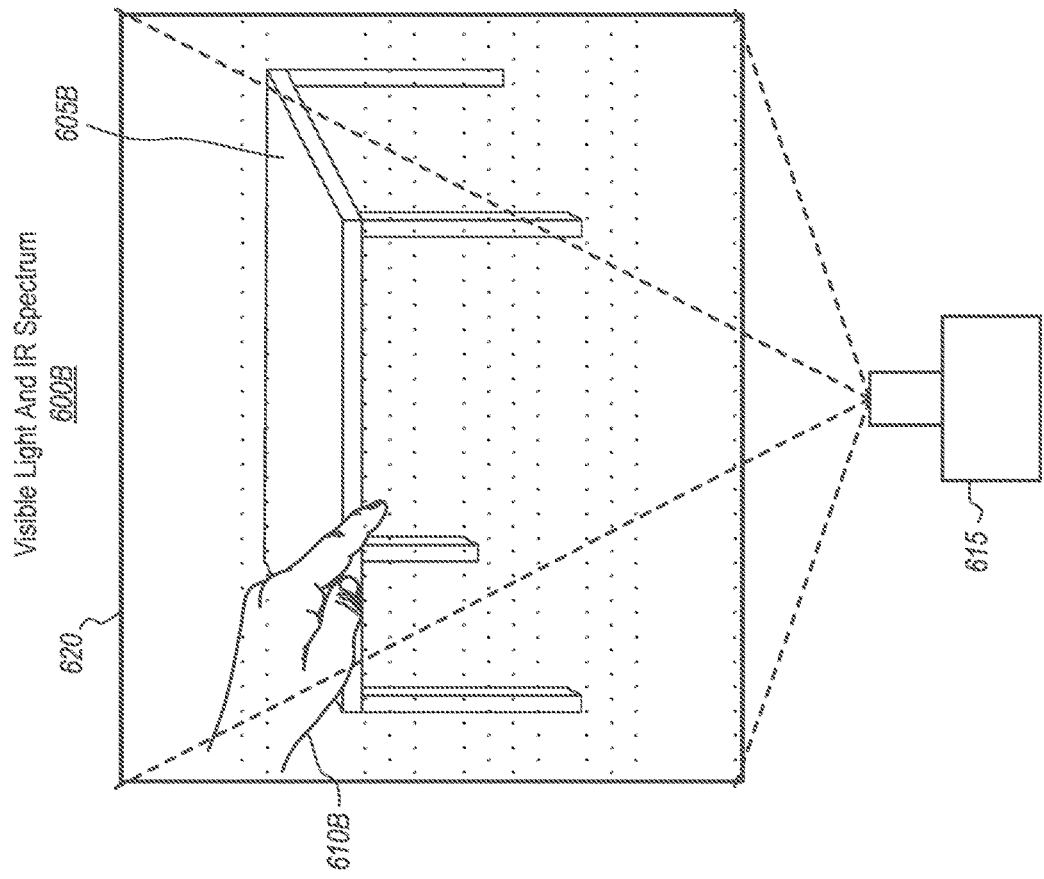
FIG. 6B shows the same environment as viewed in the IR light spectrum where the same two objects are being illuminated by visible light and the IR dot-pattern illumination.
Figure 6A:
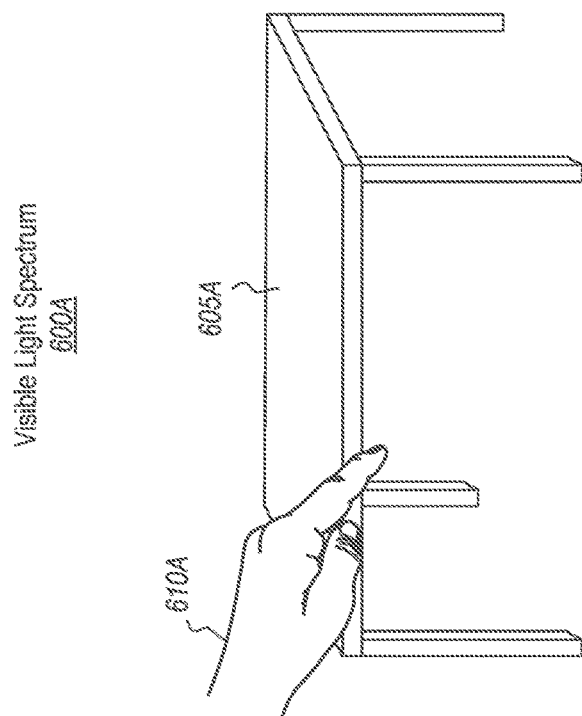

FIGS. 6A and 6B show another example usage. In particular, FIG. 6A shows an environment as viewed according to the visible light spectrum 600A. In this environment, there is a textureless/smooth tabletop 605A and a hand 610A that is partially occluding a portion of the textureless/smooth tabletop 605A. Conventional depth detection systems may have a difficult time in segmenting (i.e., distinguishing) the textureless/smooth tabletop 605A from the hand 610A because the textureless/smooth tabletop 605A does not have a sufficient amount of texture for a convention system to determine depth.

Turning now to FIG. 6B, there is the same environment, but shown in a combination of visible and IR light spectrum 600B. In particular, the environment includes a textureless/smooth tabletop 605B and a hand 610B. In this embodiment, IR dot-pattern illuminator 615 projects an IR dot-pattern illumination 620 onto both the textureless/smooth tabletop 605B and the hand 610B. As discussed in more detail below, this IR dot-pattern illumination 620 provides additional texture so that the stereo camera system of the HMD can more accurately generate a depth map for that environment.

Figure 7:
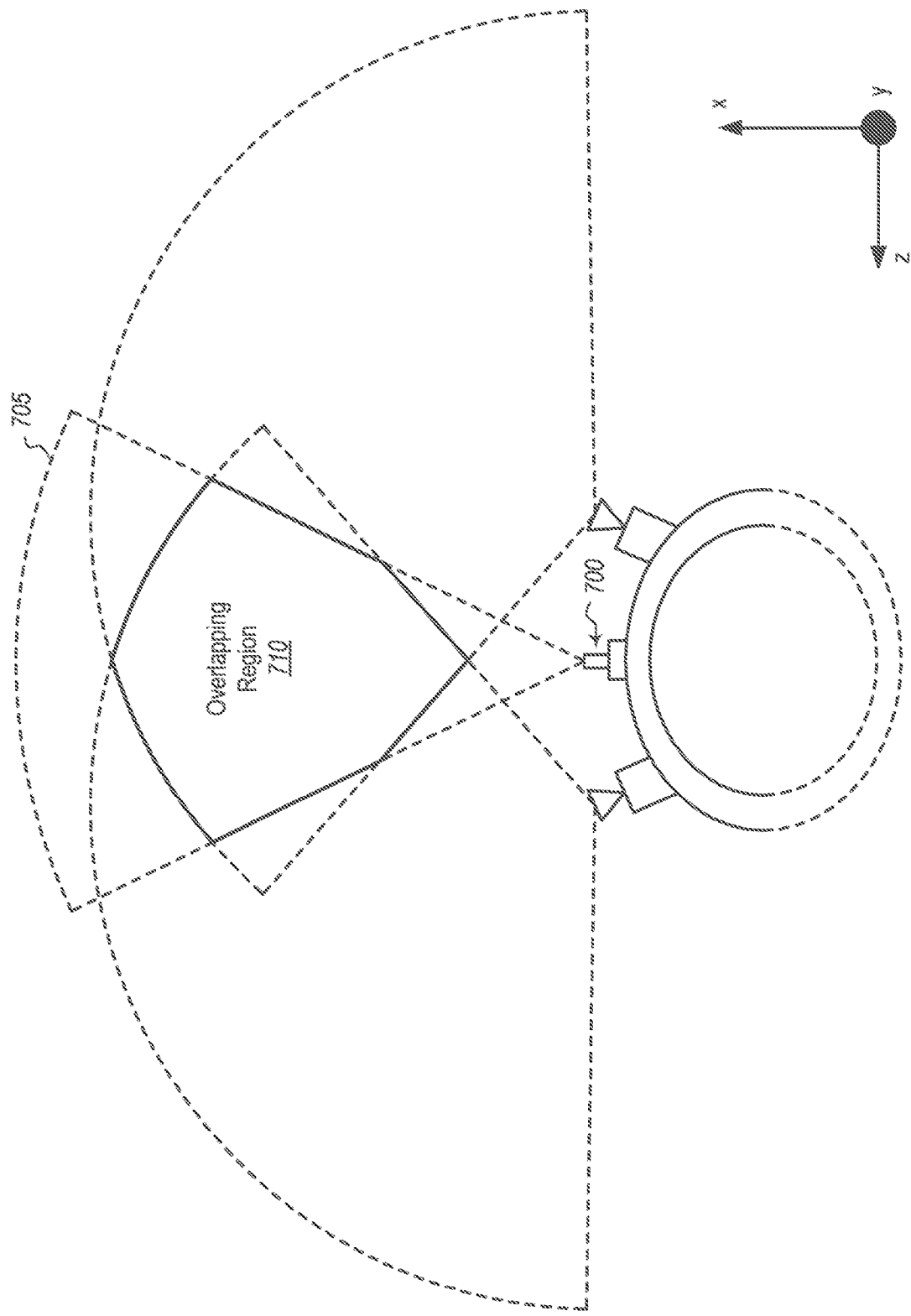
FIG. 7 demonstrates how the IR dot-pattern illuminator may be placed on the HMD and aimed in a particular manner so that its IR dot-pattern illumination will overlap the two cameras' overlapping field of view region.

Attention is now directed to FIG. 7. As shown, an IR dot-pattern illuminator 700 is mounted on an HMD. Because the elements of the HMD in FIG. 7 are very similar to the elements shown in FIG. 2 (e.g., the HMD 200, the cameras 205 and 210, and the fields of view 220 and 230), the common elements have not been relabeled.

Here, the IR dot-pattern illuminator 700 is oriented in such a manner as to emit the IR dot-pattern illumination 705 to at least partially overlap with the overlapping field of view region 710 of the HMD camera system. In some implementations, the IR dot-pattern illumination 705 overlaps a majority and/or all of the overlapping field of view region 710, while in other implementations, the IR dot-pattern illumination 705 overlaps only a minority portion of or other selected percentage (e.g., 30%, 35%, 40%, 45%, 50%, 55%, 60%, 70%, 80%, 90%, etc.) of the overlapping field of view region 710.

The overlap over the IR dot-pattern illumination 705 with the field of view region 710 enables both of the HMD's cameras to detect at least a part of the IR dot-pattern illumination 705 being reflected off of objects in the overlapping field of view region 710. In this manner, the cameras are able to obtain digital images that include digital content corresponding to the texture (i.e., the "obtained" texture is actually reflected IR light generated as a result of the IR dot-pattern illumination 705 reflecting off of surfaces in the environment). Using the left and right camera images with improved details, the stereo matching is improved, allowing the depth detection system to compute pixel disparity, thus determining depth of objects (even textureless/smooth objects) in the overlapping field of view region 710. Such functionality is shown and described in more detail below.

Figure 8:
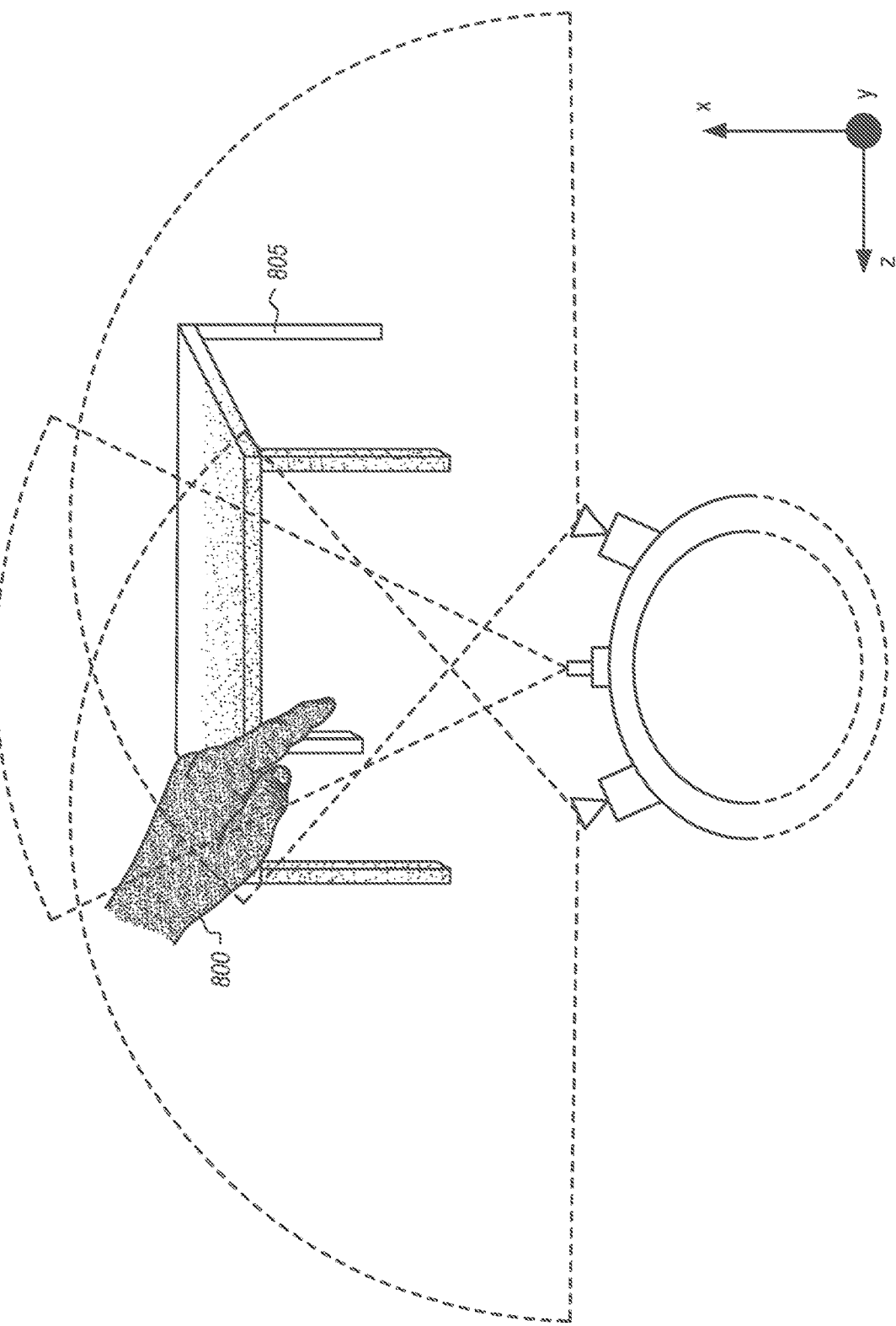
FIG. 8 shows a depth map result of performing depth detection using the disclosed principles in which one object is properly segmented from another object and in which depth values are given to the objects, regardless of whether they include textureless/smooth surfaces.

As shown in FIG. 8, a hand 800 and a table 805 corresponding to a depth map are illustrated. This depth map was generated by determining the pixel disparity of corresponding images taken by the camera stereo system of the HMD and then mapping the resulting depths to each corresponding pixel, as discussed previously. In this example illustration, because a majority of the hand 800 is substantially all in the same dimensional plain, the depth determinations for most of the hand 800 will be the same. As such, the hand 800 is illustrated with a relatively consistent depth shadowing.

In contrast, because the table 805 is not all in the same dimensional plane, it will have differing depths. These differing depths are illustrated in FIG. 8 with correspondingly different shadowing gradients associated with the different depth patterns of the table. In particular, the closer an object is to the HMD, the darker the object is. Thus, because the hand 800 is much closer to the HMD, the hand 800 is shown in a very dark color. Similarly, the portions of the table 805 that are closest to the HMD are also in a dark color. As the distance between the HMD and the table 805 increases, the color gradient progressively goes from dark to light. Accordingly, FIG. 8 provides an illustrative example of the differences in depth that objects may have and how those depths may be determined by the HMD.

As previously noted, it can sometimes be difficult to detect and map the depths of textureless/smooth objects. However, utilizing the techniques described herein, it is possible to supplement the texturing of the objects being mapped with IR dot-pattern illuminations to thereby enhance/improve the depth mapping that is performed.

Of course, it will be appreciated that the illustration shown in FIG. 8 is simply being used as an example to particularly emphasize the "visualization" of depth. To clarify, these depth shadowing gradients are not actually created by the HMD. Instead, the HMD uses a depth map that maps each pixel to one or more dimensional values. In this manner, the HMD is able to identify and record an object's varying degrees of depth. This depth map records not only horizontal and vertical dimensions for each pixel in an image, but it also records a depth dimension for each pixel in the image. Stated differently, and using conventional coordinate naming techniques, the depth map records an "x" coordinate value, a "y" coordinate value, and a "z" coordinate value for each pixel. Therefore, the HMD uses a depth map as opposed to the gradient scheme shown in FIG. 8.

As described, the stereo camera images (e.g., images that include content corresponding to the reflected IR dot-pattern light and visible light) are used to generate a depth map that is calculated via stereo triangulation (e.g., by at least determining disparity between the two images). In many embodiments, the depth map is generated for at least a part of a mixed-reality environment generated by the HMD. For example, the mixed-reality environment may include the user's hand, a table, or any other object. As such, the depth map may include a determination regarding a size and a pose of the user's hand, the table, or the other objects.

The foregoing texturing/depth mapping techniques described herein can also be beneficial for helping to perform segmentation of objects that are occluded in the field of view and to further facilitate tracking of the objects. In particular, the HMD may utilize the supplemented texturing (i.e., IR dot-pattern illuminations) to generate enhanced depth maps. In particular, the enhanced depth maps can include additional depth data that is based on reflected IR light and that supplements the data that is based on only visible light. This can be particularly useful in low ambient light conditions. In this manner, it is possible to further facilitate segmenting objects in a digital image, such as the illustrated user's hand 800 from the illustrated table 805.

The term "segmented" means that the two objects are distinguished from one another even though the hand is overlapping, or rather occluding, a portion of the table, relative to the perspective view of the HMD. The segmenting is performed by computing the depths for some or all of the pixels in the digital images that are obtained by the HMD camera system, such as by detecting the reflected visible light and the reflected IR dot-pattern illuminations, and to thereby distinguish one object from another based on their relative depths.

In some instances, segmenting can also be performed by analyzing digital images obtained from the reflected IR dot-pattern illuminations to detected known object shapes (e.g., a hand) through machine learning. For instance, the HMD system can reference object shape definitions stored locally or remotely, which match detected shapes in the digital images.

In some implementations, the depth map is also dynamically adjusted to reduce or account for a potential "jitter" phenomenon. Depth jitter may occur when neighboring pixels have vastly different depth coordinate values. Sometimes, these large differences cause the rendered visualizations to appear strange because the HMD may try to repeatedly adjust those visualizations to account for the large depth disparities. Such adjustments may cause the visualizations to "jitter" between a close position and a far position. Stated differently, these differences in determined depth may cause blatantly obvious distortions in the quality of any visualizations provided to the user.

To reduce the likelihood of a jitter, some embodiments perform filtering on the depth map. Specifically, these embodiments filter out neighboring coordinate pixels that do not share sufficiently similar depth values. "Similar," in this connotation, means that the coordinate values of the neighboring pixels are within a particular threshold value of each other. Of course, when those depth coordinates are filtered out of the depth map, they may be replaced with new depth coordinates. These new depth coordinates are selected to satisfy the threshold requirement. By performing these filtering operations, the amount of flickering that may occur will be significantly reduced, and thus the user will have a much more pleasant experience.

Figure 9:
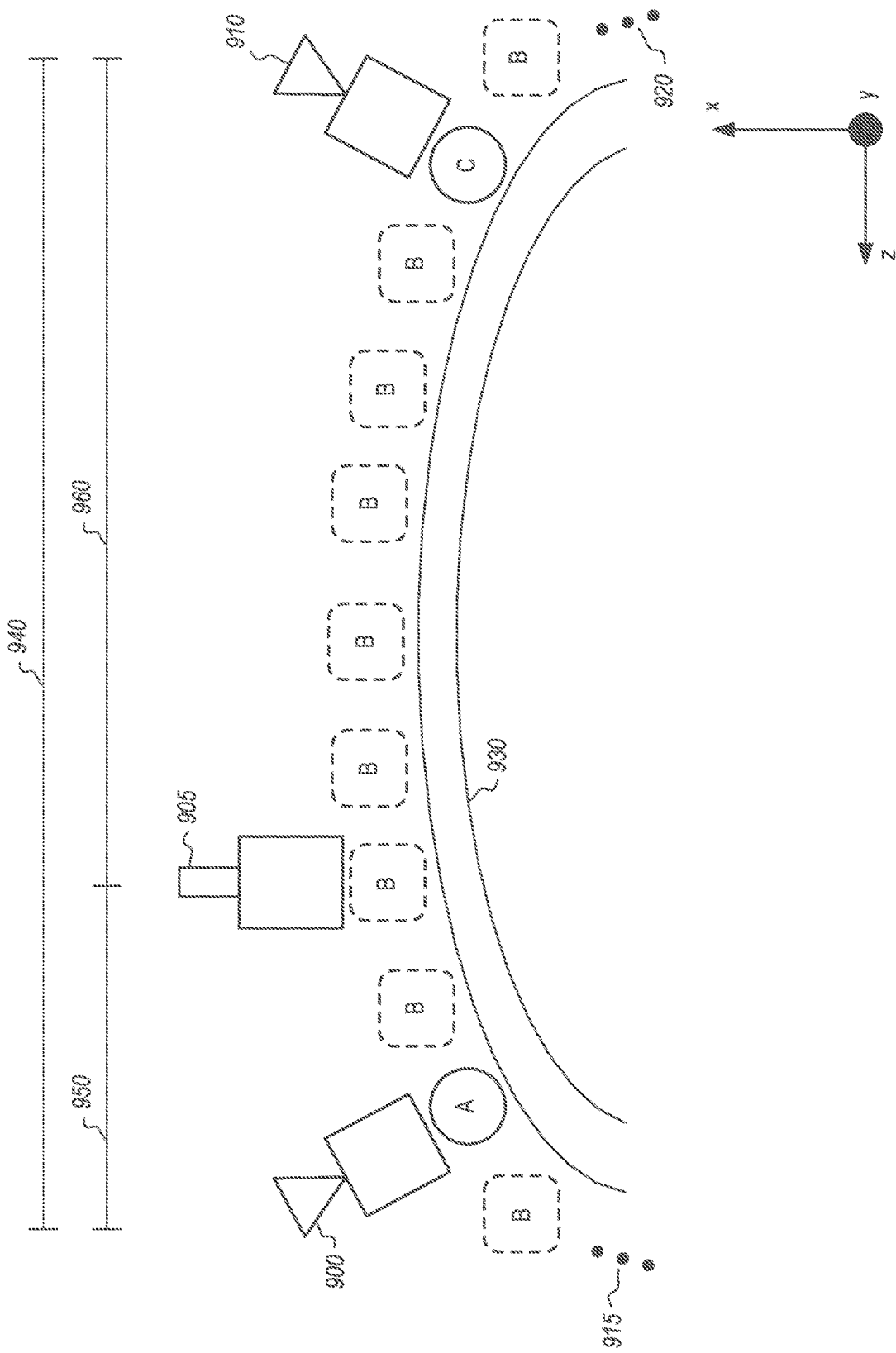
FIG. 9 illustrates various non-limiting position configurations for positioning an IR dot-pattern illuminator on an HMD.

Attention is now directed to FIG. 9, which is provided to illustrate and describe how the IR dot-pattern illuminator 905 can be mounted to the HMD 930 with various configurations relative to the stereo cameras 900 and 910.

Up to this point, the figures have shown that the IR dot-pattern illuminator is positioned roughly an equal distance between both cameras in the stereo camera pair. Other configurations are also available, however, as shown in FIG. 9. In this illustration, left camera 900, the IR dot-pattern illuminator 905, the right camera 910 are mounted on an HMD, with the circle labeled "A" illustrating one example position of the left camera 900 on the HMD, the circle labeled "C" illustrating one example position of the right camera 910 and the squares labeled "B" illustrating possible positions of the IR dot-pattern illuminator 905. Notably, the IR dot-pattern illuminator 905 may be positioned anywhere in between or outside of the left camera 900 and/or the right camera 910.

To further clarify, in some implementations, the IR dot-pattern illuminator 905 is between the left camera 900 and the right camera 910. In other implementations, the IR dot-pattern illuminator 905 is positioned closer to the left camera 900 than to the right camera 910. In yet other implementations, the IR dot-pattern illuminator 905 is positioned closer to the right camera 910 than to the left camera 900. Furthermore, the ellipses 915 and 920 demonstrate that the IR dot-pattern illuminator 905 may also be positioned further outside the periphery of either the left camera 900 or the right camera 910.

It will also be appreciated that the IR dot-pattern illuminator 905 may be a distributed illuminator that is simultaneously present/mounted at different B positions on the HMD, relative to the cameras 900 and 910.

FIG. 9 shows that one baseline 940 exists between the left camera 900 and the right camera 910. In addition to this baseline 940, there is also a baseline 950 between the left camera 900 and the IR dot-pattern illuminator 905, as well as a third baseline 960 between the IR dot-pattern illuminator 905 and the right camera 910. By placing the IR dot-pattern illuminator 905 at any of the positions marked as "B," these other baselines change. In some implementations, the IR dot-pattern illuminator 905 may beneficially act as a "virtual camera" having its own baseline(s). Further detail is provided below.

To illustrate, when the IR dot-pattern illuminator 905 is close to the left camera 900, then the baseline 950 between the IR dot-pattern illuminator 905 and the left camera 900 is smaller than the baseline 960 between the IR dot-pattern illuminator 905 and the right camera 910. In some circumstances, this is beneficial to have unequal "virtual camera" baselines (i.e., the IR dot-pattern illuminator 905's baselines) because unequal baselines may actually improve the detection of the texture (e.g., by providing different disparity calculations and by providing a mechanism for generating a virtual camera image based on the two additional baselines 950 and 960) and to thereby help to improve the overall depth determinations.

As an example, it is possible to store an image of the dot pattern as observed from the perspective of the IR dot-pattern illuminator 905 when the IR dot-pattern illuminator 905 is positioned at any of the "B" locations, based on disparities/baselines between the IR dot-pattern illuminator 905 and the corresponding cameras. This image will be constant (i.e., not dependent on environmental content) and will yield a third camera that is purely virtual. The HMD can then match the virtual pre-recorded image with real camera images. In comparison to the two-view stereo camera algorithm, the HMD (when using the virtual camera image) can produce depth results that are higher in quality. When using such a setup, it is beneficial to mount the IR dot-pattern illuminator 905 at an off-center position (i.e., any of the positions marked "B" except for the central-most position). By doing so, the HMD is able to obtain the three different baselines mentioned earlier. Notably, larger baselines are preferred for reconstructing large depths whereas small baselines are preferred for reconstructing small depths.

While FIG. 9 illustrates the variable positioning of the components from a top aerial view, it will be appreciated that the position of IR dot-pattern illuminator 905 may also vary vertically (i.e., in the y-direction) on the HMD. For instance, the IR dot-pattern illuminator 905 may be mounted higher or lower than the left camera 900 and/or the right camera 910 on the HMD. Alternatively, the IR dot-pattern 905 may be mounted levelly in the y-direction with both the left camera 900 and the right camera 910.

Figure 10:
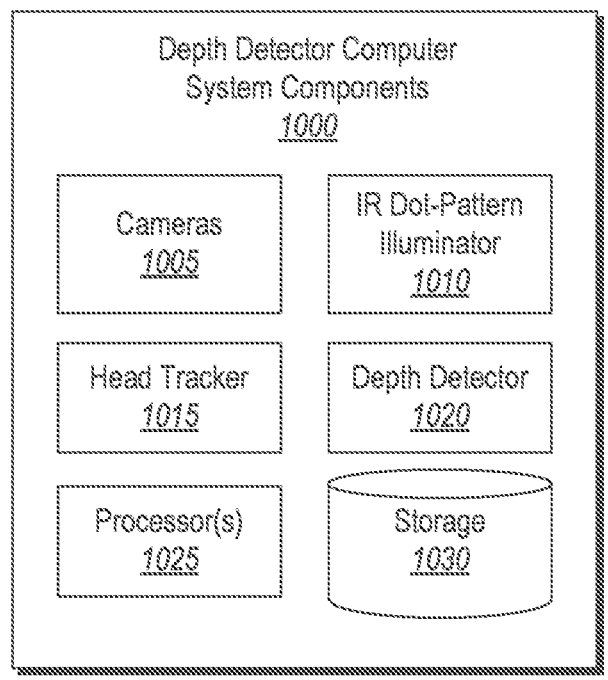
FIG. 10 illustrates various different integrated head tracking and depth detector computer system components.
Figure 11:
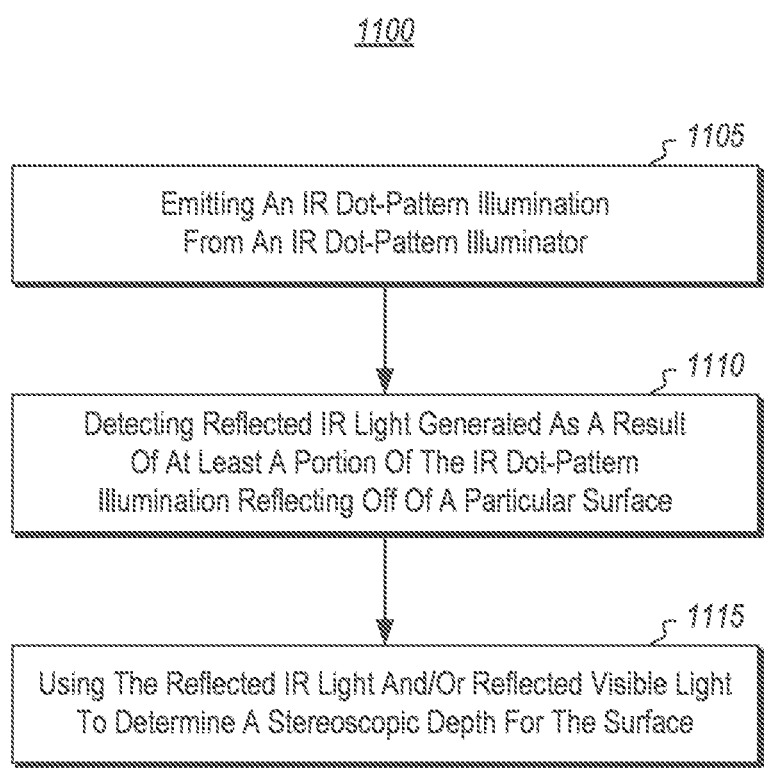
FIG. 11 provides an example method that may be performed with stereo head tracking cameras to determine a surface's depth, even if that surface is textureless/smooth, where the depth is detected using both visible light and IR light.
Figure 12:
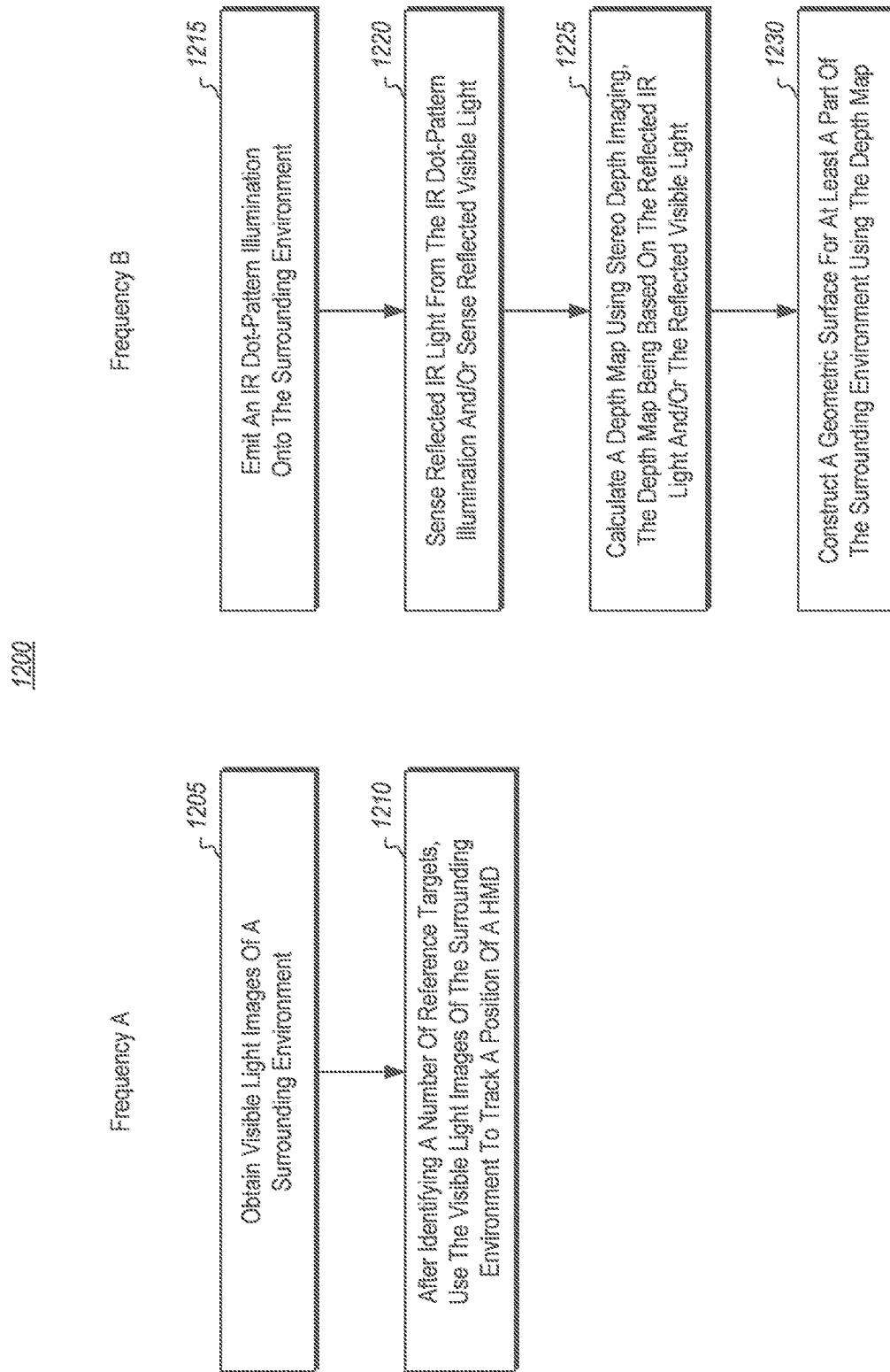
FIG. 12 shows another example method for performing depth detection with stereo head tracking cameras and which is performed in conjunction with movement detection.

Attention is now directed to FIGS. 10 through 12, which illustrate various example computer system components and various different methods that may be performed to improve depth detection with stereo tracking cameras. In FIG. 10, various depth detector computer system components 1000 are illustrated, which may be integrated into an HMD. For instance, these components may be part of the HMD 200 that was discussed in connection with FIG. 2 or any of the other HMDs discussed thus far.

Here, the depth detector computer system components 1000 include cameras 1005 which may be an example implementation of the left camera 900 and the right camera 910 from FIG. 9 or any of the other cameras discussed herein. Additionally, the depth detector computer system components 1000 include an IR dot-pattern illuminator 1010 which may be an example implementation of the IR dot-pattern illuminator 905 from FIG. 9 or any of the other IR dot-pattern illuminators discussed herein.

The various depth detector computer system components 1000 also include a head tracker 1015 and a depth detector 1020, as well as one or more processors 1025 and storage 1030. The one or more processors 1025 may include hardware processors, each of which may be specially configured processor (e.g., a graphics processing unit (GPU) or as an application specific integrated circuit ("ASIC")).

In some instances, the processor(s) 1025 include one processor that is configured to operate as the head tracker 1015 and an additional processor that is configured to operate as the depth detector 1020. Alternatively, a single processor is used to operate as both the head tracker 1015 and the depth detector 1020. More details on processors and how they operate will be provided in connection with FIG. 21. Additionally, the head tracker 1015 and the depth detector 1020 will be described in more detail in conjunction with the methods illustrated in FIGS. 11 and 12. The processor(s) 1025 also execute stored computer-executable instructions stored in the storage 1030 for implementing the acts described herein.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

As shown in FIG. 11, a flowchart 1100 is provided with various acts associated with methods for adding predetermined texture to objects located within an environment of an HMD. The first illustrated act is an act for emitting an IR dot-pattern illumination from an IR dot-pattern illuminator (act 1105), such as an illuminator that is mounted on an HMD. For reference, this act may be performed by the IR dot-pattern illuminator 1010 from FIG. 10.

In some implementations, the IR dot-pattern illuminator pulses the IR dot-pattern illumination at a high peak power. By pulsing at the high peak power, the pulsed IR light is able to compensate for ambient light noise in both the visible light spectrum and the IR light spectrum. To clarify, the IR dot-pattern illuminator's IR laser operates, in some embodiments, in a pulsed mode. When operating in a pulsed mode, the IR laser will repeatedly cycle on and off, or rather emit IR light and then not emit IR light, to thus create a pulsing emission of IR light. In some embodiments, the IR dot-pattern illuminator pulses the IR dot-pattern illumination for an exposure time between 0.5 and 5 milli-seconds, and this illumination pulse is synchronized with the camera exposure time (as described below). The repetition rate of the pulsed laser corresponds to the frame rate of the camera module, which is typically between or including 0.5 frames per second and 10 frames per second. Pulsing is beneficial because it reduces the amount of time that the laser is operating, thus reducing battery consumption. Furthermore, pulsing the IR light at the high peak power allows the IR light signal to be more detectable and to thereby overcome any ambient light noise. The use of bandpass filters can also help to filter out ambient light noise.

On a related note, when the IR laser is operating in a pulsed mode, then the stereo camera pair is synchronized with the IR laser's pulsing. For example, the cameras will obtain images in sync with the IR laser emissions, timed to detect the corresponding IR light reflections. In more particular, the pulsing of the IR dot-pattern illumination is synchronized, in some embodiments, with the exposure time of the cameras. The exposure times of the cameras may also be increased or decreased in order to increase the number of photons that are captured in the cameras' images. This can be particularly beneficial when performing tracking in a low light environments, which will be discussed in more detail below.

The exposure times of the cameras may also vary depending on which operation, or rather mode, the HMD is operating in, be it a head tracking mode, a hand tracking mode, or a depth detection mode. For head tracking operations, example exposure times range anywhere between 0.016 milli-seconds up to and including 25 milli-seconds. Of course, the exposure time may vary within this range such that the HMD may not always use the same exposure time for all head tracking images. For instance, if the HMD determines that a sufficient/predetermined amount of photons have been sensed to generate an image that is usable for performing tracking or depth detection, then the HMD will selectively/dynamically reduce its cameras' exposure time. Similarly, if the HMD determines that additional photons are needed to generate an image that is usable for performing tracking or depth detection, then the HMD will selectively/dynamically increase the exposure time. In this manner, the HMD may use a variable exposure time. In some embodiments, the HMD will dynamically vary its cameras' exposure times depending on which operation, or rather mode, the HMD is operating in (e.g., tracking mode, depth detection mode, burst mode, pulsed mode, etc.).

For depth detection operations, example exposure times will be set, in some embodiments, to range anywhere from 0.5 milli-second up to and including 5 milli-seconds. Furthermore, it will be appreciated that in some embodiments, the exposure times for two or more of the cameras are synchronized with each other such. Additionally, in some embodiments the illumination time, whether for the IR dot-pattern illuminator or for the flood IR illuminator, overlaps the entirely of the cameras' exposure times to maximize the amount of light captured by the cameras.

In some embodiments, the HMD initially uses its cameras to detect an amount of reflected IR light generated as a result of the IR dot-pattern illuminator emitting the IR dot-pattern illumination. In response to a detected "intensity" of the reflected IR light and/or ambient light, which intensity may be detected using the cameras, the HMD modifies a power level of the IR dot-pattern illuminator until a predetermined threshold intensity of the reflected IR light is detected by the cameras. As such, the HMD is able to dynamically adjust the power level of the IR dot-pattern illuminator in order to increase or decrease the intensity of the IR light, when necessary (e.g., in low light conditions) to obtain a desired level of detail in the captured images used for depth detection and/or tracking. Such adjustments are particularly beneficial for enabling the HMD to use only as much power as necessary in obtaining sufficiently adequate images for determining depth. Further, adjusting the illumination intensity may be performed differently for head tracking versus hand tracking, because hands are typically located within 1 meter of the HMD, the HMD can emit IR light with a lower intensity when performing hand tracking (where the user's hand is typically within 1 meter of the HMD), as compared to the higher intensity of IR light that is emitted when performing head tracking and it is necessary to flood the environment with more light to gather information from objects that are more than 3 meters away from the HMD.

Returning to FIG. 11, reflected IR light is subsequently detected (act 1110). In addition to detecting reflected IR light, the cameras also detect visible light. This act is performed by the cameras 1005 described in FIG. 10 and throughout this paper. Notably, this reflected IR light is generated as a result of at least a portion of the IR dot-pattern illumination reflecting off of the surface in the environment (e.g., the textureless/smooth tabletop 605A from FIG. 6A).

To detect this reflected IR light, a first image, which includes digital content corresponding to a first part of the IR dot-pattern illumination, is captured using one of the cameras. Concurrently with that operation, a second image is also captured using the second camera. The second image includes digital content corresponding to a second part of the IR dot-pattern illumination and which includes digital content corresponding to at least some of the same IR dot-pattern illumination that was captured in the first image. Furthermore, the images also include reflected visible light.

The first image and the second image are then used to determine a depth for at least the common part of the illumination area that was captured in both images (act 1115). By obtaining images of the reflected IR light using both a left camera and a right camera, the HMD is able to measure the pixel disparity present between common pixels in the two images. This pixel disparity may then be used by the depth detector 1020 of FIG. 10 to determine the stereoscopic depth for that object.

Notably, HMD is able to determine a depth for objects in the environment, even when those objects have textureless/smooth surfaces because of the IR dot-pattern that adds texture to the objects. By determining the depth for objects in this manner (i.e., stereo vision), it is not necessary to utilize additional hardware/components to perform depth via time-of-flight. For reference, time-of-flight systems are much more expensive because they use additional hardware components. In contrast, the current embodiments re-purpose many existing components so that they can perform new or additional functionalities, thus saving significant costs and thereby reducing computational and power burdens on the HMDs.

FIG. 12 illustrates another example flowchart 1200 of methods that may be performed for performing geometric surface reconstruction in conjunction with head tracking. Similar to the methods described in reference to FIG. 11, the methods of FIG. 12 may be performed by the depth detector computer system components 1000 shown in FIG. 10.

As illustrated, method 1200 is shown as being dispersed in two different columns (e.g., the column of acts under the label "Frequency A" and the column of acts under the label "Frequency B"). Such formatting was selected to show that the various acts may not be temporally dependent on one another.

With that understanding, method 1200 is shown as including a number of various different acts that may be performed at a first selected frequency (i.e., Frequency A). Initially, the HMD's head tracking stereo camera pair is used to obtain one or more visible light images of the HMD's surrounding environment (act 1205). This may be accomplished with the cameras described herein. Using these images, the HMD is able to identify a number of reference targets (e.g., anchor points) in the mixed-reality environment. Using these reference targets, the HMD is then able to track position and orientation, as described below.

After identifying a number of reference targets (i.e., anchor points) from within the images (to be discussed in more detail below), the one or more visible light images are then used to track a position of the HMD within the surrounding environment (act 1210). This may be performed, for example, with the head tracker 1015 of FIG. 10.

As further illustrated, the methods of FIG. 12 may also include additional acts that are performed at a second selected frequency (i.e., Frequency B). Notably, Frequency B may be different than Frequency A, such that the camera images are taken at different time stamps. For example, the acts under Frequency A correspond to head tracking and may be performed at a rate of 30 frames per second (hand tracking is discussed later and may be performed at yet another frequency that is more than 30 frames per second or a variable frequency). In contrast, the acts under Frequency B correspond to depth detection and may be performed at a rate of less than 30 frames per second, such as 5 frames per second.

It will be appreciated that the referenced frequencies are illustrative only and non-limiting. For example, Frequency A may be 15, 20, 25, 30, 35, 40, 45 frames per second, or other frame rates, and Frequency B may be 0.5, 1, 2, 3, 4, 5, 6, 7, 8, 9, 10 frames per second, or other frame rates. In some implementations, the second selected frequency (i.e., Frequency B) is lower than the first selected frequency (i.e., Frequency A). As such, sensing the reflected IR light at the second selected frequency (i.e., the operations under the "Frequency B" label) may be interleaved among the operations of obtaining the images of the surrounding environment at the first selected frequency (i.e., the operations under the "Frequency A" label).

Returning to FIG. 12, the HMD's IR dot-pattern illuminator emits an IR dot-pattern illumination onto at least a part of the surrounding environment (act 1215). This may be performed by the IR dot-pattern illuminators described herein.

Next, the head tracking stereo camera pair senses "reflected" IR light and/or reflected visible light (act 1220). This act may be performed by the cameras described herein, which are configured to detect/sense visible light and IR light.

Subsequently, a depth map is calculated/generated, using stereo depth imaging (act 1225). This depth map is based on the reflected IR light and/or the reflected visible light that is captured by the stereo camera pair. This act may be performed, for example, by the depth detector 1020 from FIG. 10.

Finally, a geometric surface may be constructed for the surrounding environment (specifically the part that was illuminated by the IR dot-pattern illumination) using the depth map (act 1230). This act may be performed by the depth detector 1020 from FIG. 10.

It will be appreciated that the application and use of IR dot-pattern illumination and repurposed use of head tracking cameras can significantly improve the quality of depth calculation for HMDs, and while reducing costs of the HMDs. Such processes are also particularly beneficial when the environment surrounding the HMD includes textureless/smooth surfaced objects.

Improved Methodologies for Tracking Movement, Particularly in a Low Light Environment Most mixed-reality HMDs are portable for use in different locations and environmental conditions. For example, the HMD may be worn in brightly lit environments, such as outside during broad daylight, as well as in dark or low light conditions, such as at night or in a dark room. However, conventional systems have been quite deficient when it comes to tracking movement in a low light environments.

As briefly discussed earlier, to perform tracking (i.e., movement detection), the HMD often uses at least two cameras to record images of the surrounding environment. In particular, the HMD uses its cameras to identify regions with high spatial information (e.g., areas that include a large amount of fixed features suitable to act as a reference), and then the HMD uses this high spatial information to identify "anchor points." To clarify, the cameras' images are analyzed to identify one or more anchor points within that environment. An anchor point is a non-moving physical feature that can serve as a reference point in determining the HMD's position in relation to the environment. As the position of the HMD changes, the HMD is able to use information from inertial measurement units (IMU), gyroscopes (for high frequency changes), accelerometers, and the cameras' images (for low frequency anchoring) to detect the changing position and orientation of the HMD relative to the anchor points.

An example of an anchor point includes, but is not limited to, a corner of an object located in an environment surrounding the HMD. When the HMD obtains images and then analyzes those images, it can identify anchor points within that image. When a sufficient number of anchor points are identified, then the HMD can determine its position and orientation in the environment relative to the identified/mapped anchor points. Problems arise, however, when the environment is a low light environment because the head tracking cameras may not have a sufficient number of photons to accurately generate a camera image of the scene, and to be able to adequately identify the anchor points within the images. As such, traditional movement detection solutions have been quite deficient when used in low light environments.

To address these needs, some of the disclosed embodiments make use of a flood IR illuminator, which is different than an IR dot-pattern illuminator. Recall, the cameras in the stereo camera pair are able to detect both visible light as well as IR light. By projecting a flood of infrared light, the cameras are able to capture images of reflected IR light and use those images to help with the process of performing movement detection, including head tracking, hand tracking, etc. Such use is particularly beneficial when images that capture visible light are inadequate to detect a sufficient number of anchor points (this topic will be covered in more detail later). As such, the images that capture the flood of IR light may be used to augment and/or replace the visible light images when identifying anchor points.

Attention will now be directed to FIGS. 13A through 17. These figures illustrate various different example architectures, methods, and supporting illustrations for improving the process of head tracking, particularly within low light environments.

Figure 13A:
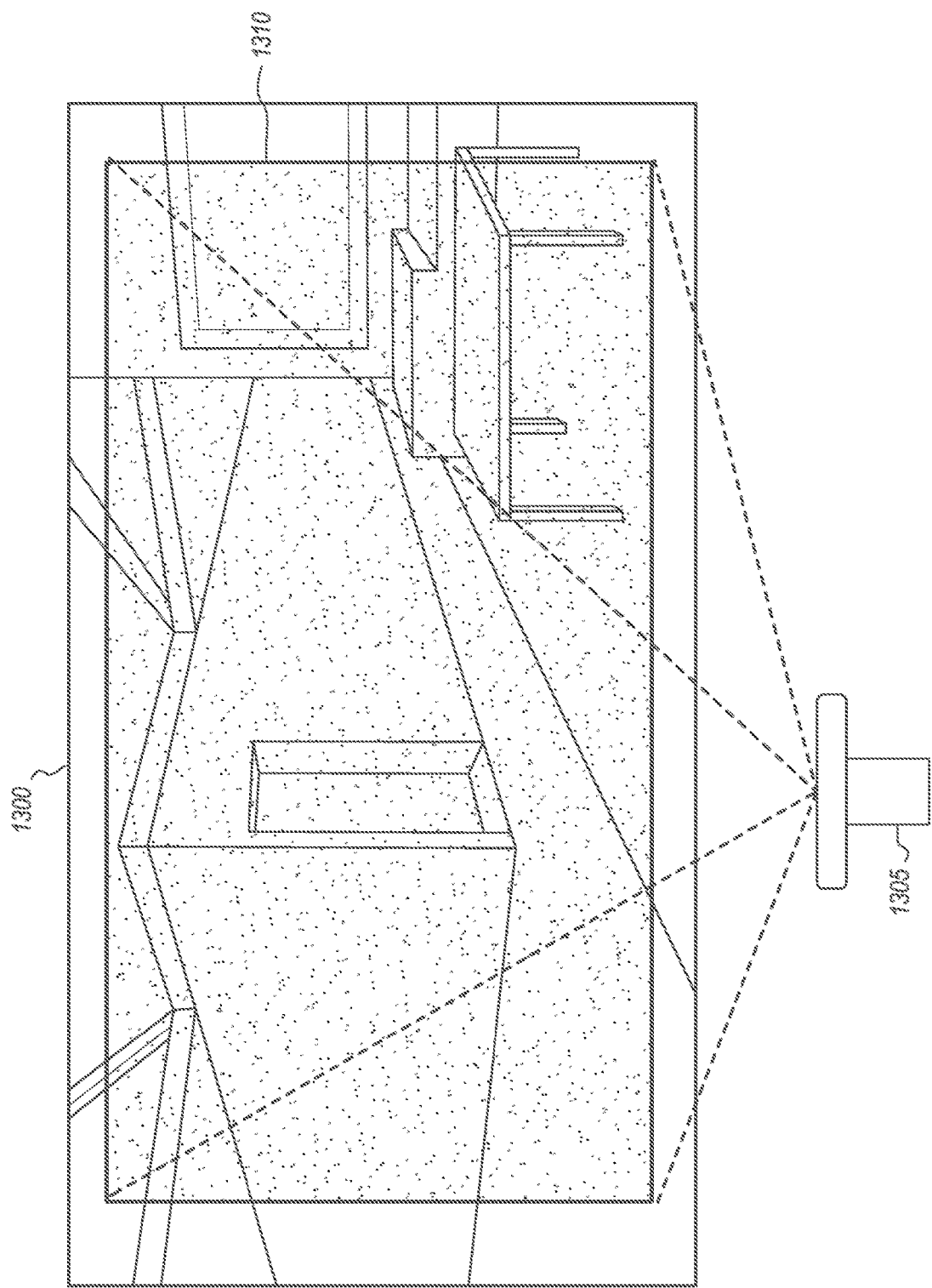

Turning first to FIG. 13A, a low light environment 1300 is illustrated. For reference, a bright sunny day typically has an ambient light intensity of around 10,000-50,000 lux. An overcast day typically has an ambient light intensity of around 1,000-10,000 lux. An indoor office typically has an ambient light intensity of around 100-300 lux. The time of day corresponding to twilight typically has an ambient light intensity of around 10 lux. Deep twilight has an ambient light intensity of around 1 lux. As used herein, the illustrated low light environment 1300 least corresponds to any environment in which the ambient light intensity is at or below about 40 lux. The HMD has one or more sensors that are configured to determine the surrounding environment lux intensity. These sensors can be incorporated into or independent from the cameras and/or illuminators described herein.

FIG. 13A also illustrates a flood IR illuminator 1305. As used herein, the flood IR illuminator 1305 includes one or more of an IR LED, an array of IR LEDs, an IR laser diode, an incandescent discharge illuminator, a VCSEL, a plasma discharge illuminator, etc. The flood IR illuminator 1305 also includes, in some embodiments, a corresponding collimating optic. The IR illuminator is configured to emit a broad-beamed, homogeneous ray of light that spans a large illumination area. By "homogeneous," it is meant that all illumination points are subjected to substantially the same amount of light.

In this manner, the flood IR illuminator 1305 is configured to emit a flood of IR light spread across a selected field of view that at least partially illuminates the head tracking camera's FOV. This field of view may be spanned differently. For example, the field of view may span 90 degrees, 100 degrees, 110 degrees, 120 degrees, 130 degrees, and so on. Additionally, the flood IR illuminator 1305 may be but one of an array of multiple illuminators.

As shown in FIG. 13A, the flood IR illuminator 1305 is emitting a flood of IR light 1310 into the environment 1300. Such a process is particularly beneficial because it helps illuminate potential anchor points that may be used to track movements.

Such a scenario is shown in FIG. 13B. It will be appreciated that the cameras are able to detect both visible light and IR light. In some instances, the cameras capture images of reflected IR light and use these IR light images to detect anchor points in any kind of environment, even in low light environments.

As shown in FIG. 13B, the HMD is able to detect a vast array of different anchor points 1315. These anchor points 1315 are symbolically identified through the use of the dark circles. In some scenarios, these anchor points are fixed physical features, such as corners, that are useful for determining the HMD's position and orientation in relation to its surrounding environment. As will be discussed later, the HMD may identify any number of anchor points.

Attention will now be directed to FIG. 14, which illustrates an HMD that is similar to the HMD 200 from FIG. 2. As a result, the common components (e.g., the left and right cameras) will not be relabeled. This HMD is specially configured to perform movement detection (e.g., head tracking, hand tracking, etc.) in low light environments.

As discussed earlier, the HMD includes at least two cameras (though more than two may be used), both of which are configured to obtain one or more visible light images of the low light environment as well as one or more IR light images of the low light environment. Notably, these visible light and IR light images may be used to track movements of the HMD. Of course, a single image may capture both visible light and IR light.

In addition to the cameras, the HMD also includes at least one flood IR light illuminator. In the scenario shown in FIG. 14, the HMD includes a left flood IR illuminator 1400 and a right flood IR light illuminator 1405. Therefore, in this example scenario, two flood IR light illuminators are mounted on the HMD, each of which is emitting a different flood of IR light. Of course, it will be appreciated that the HMD may include any number of flood IR light illuminators. For example, the HMD may include 1, 2, 3, 4, 5, 6, 7, 8, or any number of flood IR light illuminators.

These flood IR light illuminators may be example implementations of the flood IR illuminator 1305 from FIG. 13A. Specifically, these flood IR illuminators 1400 and 1405 are configured to emit a flood of IR light that spans an illumination area. For example, the left flood IR illuminator 1400 is emitting the flood IR illumination 1410, and the right flood IR illuminator 1405 is emitting the flood IR illumination 1415.

As shown, both of the flood IR illuminators 1400 and 1405 are mounted on the HMD. In some implementations, the left flood IR light illuminator 1400 is mounted on the HMD proximately to the left camera, and the right flood IR light illuminator 1405 is mounted on the HMD proximately to the right camera. Similar to that which was discussed for the dot-pattern illuminator, however, the left and right flood IR light illuminators 1400 and 1405 may be mounted anywhere on the HMD and in any orientation.

The IR illuminator 1400 is mounted on the HMD relative to the cameras so that the flood IR illumination 1410 overlaps at least some, and preferably a majority, of the left camera's field of view 1420. Similarly, the IR illuminator 1405 is mounted on the HMD relative to the cameras so that the flood IR illumination 1415 overlaps at least some, and preferably a majority, of the right camera's field of view 1425. This overlap is illustrated by the overlapping regions 1430 and 1435. In this manner, some, and preferably most (or all), of the cameras' fields of view will be illuminated with flood IR light. This configuration is advantageous because it enables the HMD to use its cameras to identify anchor points within any kind of environment, even low light environments. Of course, the aforementioned resulting overlap may occur in different percentages. For example, the flood IR illuminations 1410 and 1415 may overlap the fields of view 1420 and 1425, respectively, by 20%, 25%, 30%, 40%, 50%, 60%, 70%, 80%, 90%, or even 100%.

In some circumstances, the flood IR light illuminators 1400 and 1405 always emit their respective flood of IR light while the HMD is actively generating a mixed-reality environment. In other circumstances, the flood IR light illuminators 1400 and 1405 are triggered to turn on only when a particular condition occurs.

Examples of triggering conditions include, but are not limited to, (1) a detection (either by the HMD's cameras or by an ambient light sensor of the HMD) that the ambient light intensity of the surrounding environment has fallen below a threshold intensity value (e.g., 40 lux) and/or (2) a determination that the number of detectable/detected anchor points is below a preselected number of anchor points (e.g., 6, 7, 8, 9, 10, 15, 20, 25, 30, 35, 40, 45, 50, 55, 60, 90, 100, 200, etc. anchor points).

Additionally, the flood IR light illuminators 1400 and 1405 may operate in a pulsed mode, similar to that which was described above. Accordingly, by projecting a flood of IR light into the HMD's environment, the HMD will be able to better determine its position within the environment, and thus better track movements within that environment.

Figure 15:
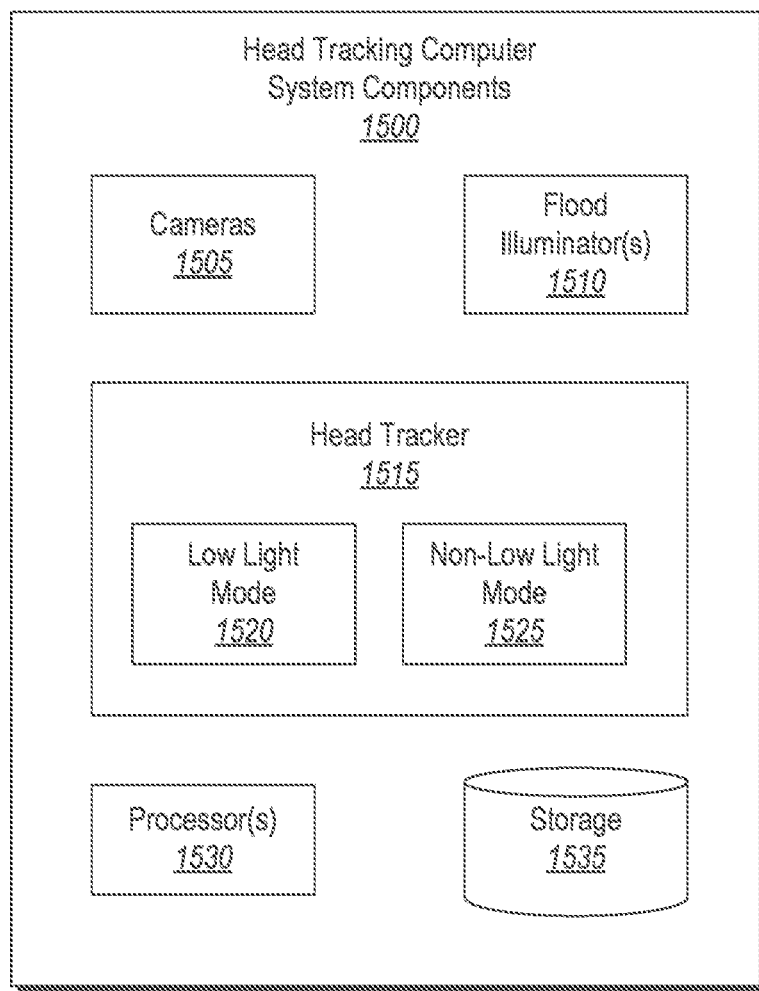
FIG. 15 shows various different head tracking computer system components.
Figure 16:
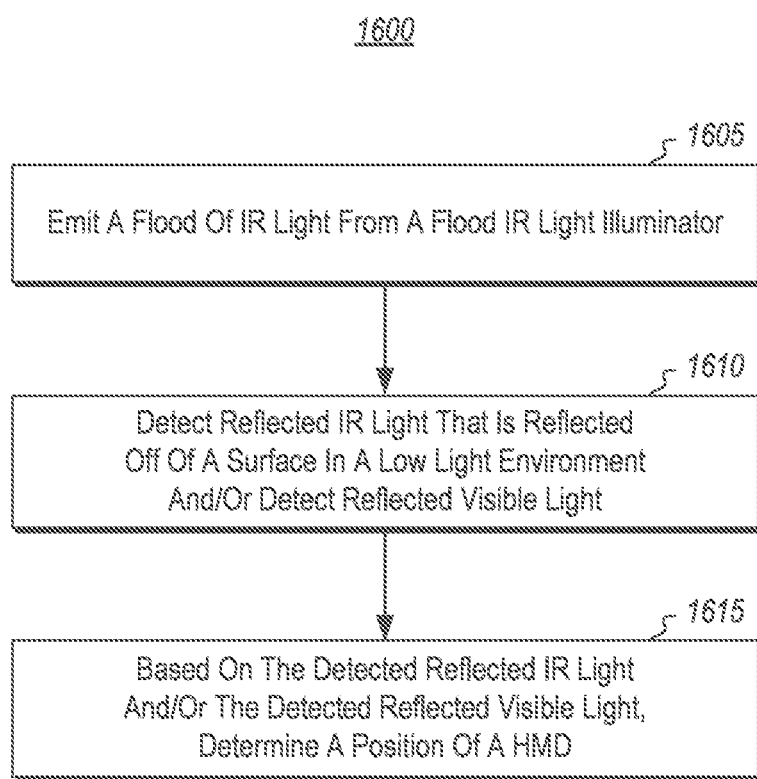
FIG. 16 illustrates an example method for performing movement detection in various environments, including low visible light environments.
Figure 17:
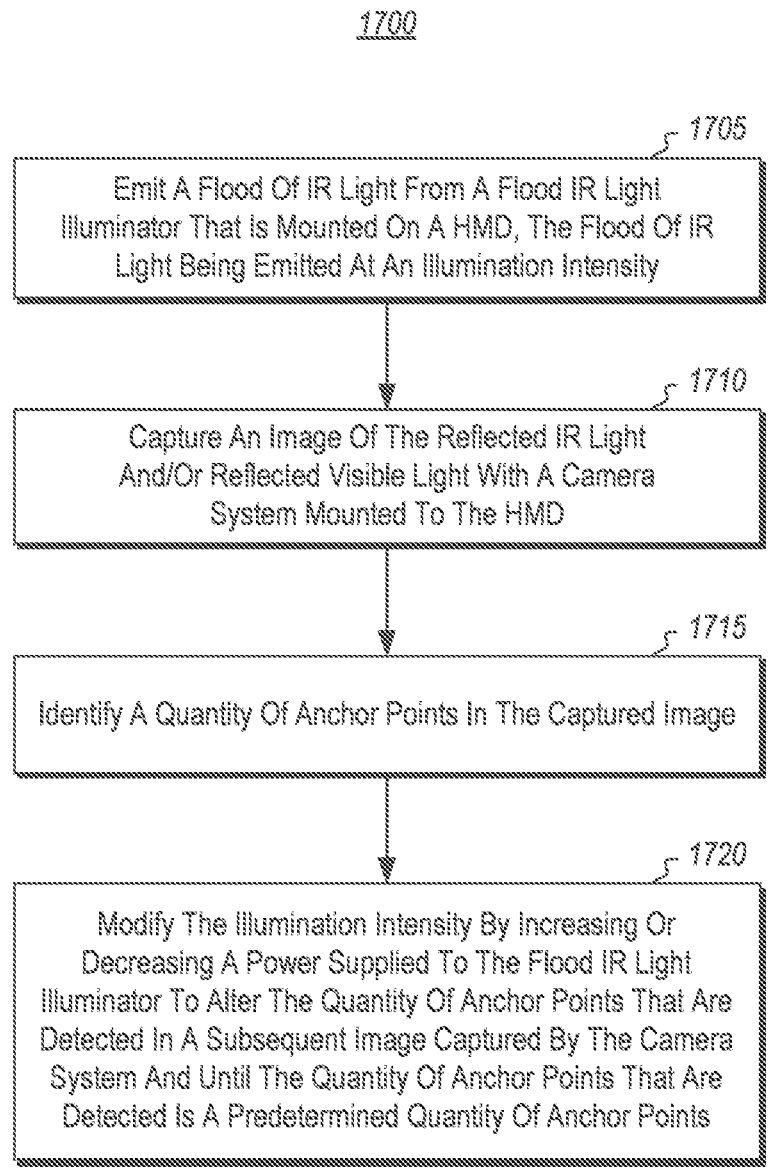
FIG. 17 illustrates an example method for adjusting an illumination intensity of a flood IR illuminator mounted to an HMD.

Attention will now be directed to FIGS. 15 through 17, which illustrate example computer system components and methods that may be used to perform head tracking with the use of flood IR illuminators in low light environments.

FIG. 15 illustrates various different head tracking computer system components 1500 that may be included in any of the HMDs discussed thus far. In particular, the components include cameras 1505 (e.g., the cameras 205 and 210 from FIG. 2), one or more flood illuminators 1510 (e.g., the left flood IR illuminator 1400 and the right flood IR illuminator 1405 from FIG. 14), and a head tracker 1515.

The illustrated head tracker 1515 is configured, in some instances, to selectively operate in a low light mode 1520 and a non-low light mode 1525. The low light mode 1520 is used when the HMD is being utilized in a low light environment. The non-low light mode 1525 is used when the HMD is being utilized in bright light environments. The HMD dynamically adjusts modes and controls the timing for turning on/off the flood IR light illuminators based on detected light conditions.

The HMD system components also include one or more processors 1530 and storage 1535. The one or more processors 1530 may be specially configured to operate as the head tracker 1515 and to execute stored computer-executable instructions stored in the storage 1535 for implementing the acts described herein.

FIG. 16 illustrates a flowchart 1600 of various acts associated with methods for tracking movements of a HMD in any kind of environment, including low light environments. The illustrated acts may be performed by the head tracking computer system components 1500, which may be included in an HMD.

The first illustrated act is an act of emitting a flood of IR light from a flood IR light illuminator mounted on the HMD (act 1605). This act may be performed by the flood illuminators 1510 from FIG. 15, for example.

Next, reflected IR light is detected (act 1610). This act may be performed by the cameras 1505 from FIG. 15, for example. In addition to detecting the reflected IR light, visible light is also detected using the cameras 1505. Therefore, both visible light and IR light are detected. In this manner, the visible and reflected IR light is detected by the HMD's head-tracking stereo camera pair. Based on the detected reflected IR light and/or the detected reflected visible light, a position of the HMD is determined (act 1615). This act may be performed by the head tracker 1515, for example. Detecting the position of the HMD may be performed in the manner described above in reference to the inside-out camera detection techniques.

Similar to the IR dot-pattern illuminators that were discussed earlier, the flood IR light illuminators may also be pulsed. When this occurs, the pulsing of the flood IR light illuminators may be synchronized to coincide with the cameras' exposure times. In other words, the cameras may also be pulsed. Pulsing the flood IR light illuminators may be advantageous for reducing illumination thermal loads and battery consumption.

FIG. 17 illustrates another related flowchart 1700 of various acts for tracking a position of an HMD within a surrounding environment. Specifically, method 1700 advantageously demonstrates how the illumination intensity of a flood IR light illuminator can be dynamically adjusted to ensure that a sufficient number of anchor points are detectable within an IR light image.

As shown, a flood of IR light is initially emitted from a flood IR light illuminator (act 1705). This act may be performed by the flood illuminators 1510 from FIG. 15, for example. Here, the flood of IR light may be emitted at an initial illumination intensity into the surrounding environment. Such an operation results in reflected IR light being reflected from one or more objects in the surrounding environment.

Next, an image that includes digital content corresponding to the reflected IR light (and/or reflected visible light) is captured, or rather obtained, using the HMD's camera system (e.g., the stereo camera pair) (act 1710). This act may be performed by the cameras 1505 from FIG. 15, for example. In some instances, multiple images are obtained and then a selected subset of images are be used (e.g., image(s) having the least relative amount of blurring).

Subsequently, the HMD identifies a selected quantity of anchor points from within the captured/selected image(s) (act 1715). This act may be performed by the head tracker 1515 from FIG. 15, for example.

Finally, the illumination intensity is subsequently modified (act 1720). The modification to the illumination intensity of the flood illuminator(s) 1510 can be controlled by the head tracker 1515. Such a modification occurs by increasing or decreasing a power supplied to at least one flood IR light illuminator. Increasing or decreasing this power alters the amount of reflected IR light that is detectable by the cameras. In a corresponding manner, the modification can also alter the quantity of anchor points that are detectable in a subsequent image captured by the camera system. This modification may iteratively and dynamically occur until the quantity of anchor points that are detectable satisfies a predetermined threshold quantity of anchor points (e.g., 6, 7, 8, 9, 10, 15, 20, 30, 50, 100, 200, etc.).

The process of identifying the anchor points may additionally include (1) measuring a mean illumination intensity over a set of pixels in the captured image and then (2) indexing the set of pixels in the captured image to a particular anchor point when the mean illumination intensity for that set of pixels reaches a predefined value.

In some instances, machine learning image segmentation is also performed to enhance/supplement/replace the mapping of anchor points from captured images.

Additionally, or alternatively, the process of adjusting the illumination intensity to identify anchor points may include enforcing a predefined signal to noise characteristic for any image pixels that are determined to correspond to that anchor point. To illustrate, for every intensity level, it is possible to measure the noise level by computing the variance of intensity values within an image patch. The intensity can then be adjusted until the variance equals a predefined value. As described below, the depth map may also be analyzed to help with the process of determining which pixels correspond with which objects.

To illustrate, the anchor points may be identified by factoring in the depth of an object. Even more particularly, it is generally known that light decays with the square of the distance. This means that the HMD may use 4 times the illumination strength to illuminate an object's area at a distance of 2 meters as compared to areas at a depth of 1 meter. Depth detection provides information about the current object's depth for every frame. If the HMD is moved closer to the object, the HMD can then reduce the illumination power. In the case of moving away from the object, then the HMD may increase the illumination strength. As a result, there are many different processes for illuminating and identifying anchor points and for determining when and how much to dynamically modify the light intensity.

Therefore, by incorporating the use of one or more flood IR light illuminators, the HMD is able to better track movements within any kind of environment, including low light environments.

Hybrid System for Determining Depth and Tracking Movement

The following disclosure provides descriptions of hybrid systems that are configured to perform depth detection and tracking with HMD systems in various environments, even low light environments. Such hybrid systems are beneficially used for hand tracking purposes. Previous embodiments focused on generating a depth map that corresponds to a large surrounding HMD environment. In some of the following embodiments, however, only a limited depth map is used for performing hand tracking.

Figure 18:
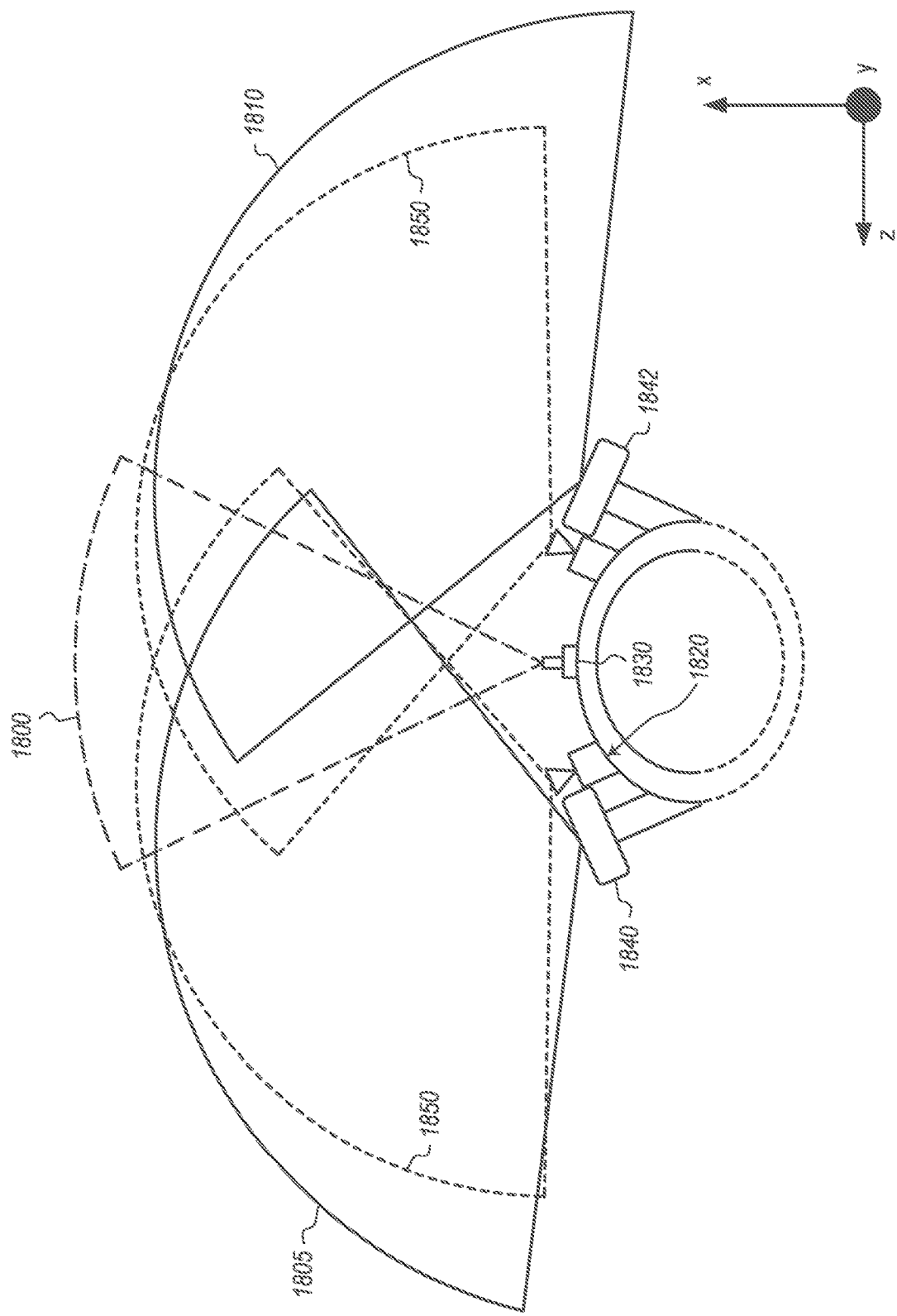
FIG. 18 depicts a hybrid HMD that includes both an IR dot-pattern illuminator as well as a flood IR illuminator.

Turning first to FIG. 18, an HMD is illustrated that includes one or more flood IR light illuminators, one or more cameras, and one or more IR dot-pattern illuminators. Because these components are similar to the components shown in FIGS. 7 and 14, the common components have not been relabeled.

As shown, the IR dot-pattern illuminator 1830 is emitting an IR dot-pattern illumination 1800 which adds texture to the HMD's environment. Additionally, the left flood IR light illuminator 1840 is emitting a flood IR illumination 1805, and the right flood IR light illuminator 1842 is emitting a flood of IR illumination 1810. The flood IR illuminations 1805, 1810 overlap the fields of view 1850 of the HMD cameras 1820, as previously discussed. Notably, these cameras 1820 are configured to detect both visible light and IR light.

In this embodiment, the IR dot-pattern illuminator 1830 is emitting the IR dot-pattern illumination 1800 according to a particular frequency (e.g., the frequencies that were discussed earlier). Additionally, as also discussed, the cameras 1820 may be synchronized with operational frequency of the IR dot pattern illuminator 1830.

In this embodiment, the flood IR light illuminators 1840 and 1842 are configured to emit a flood of IR light to illuminate the mixed-reality scene in an effort to improve movement detection, regardless of whether that movement is the HMD's movement or a hand movement. Here, the flood IR light illuminators 1840 and 1842 emit the flood of IR light according to a different frequency than the frequency of the IR dot pattern illuminator 1830. The cameras are also synchronized to capture images at the operational frequency of the IR pattern illuminator 1830, so as to obtain images for head tracking purposes. A third camera frequency is also used, in some instances, for capturing images used for hand tracking, as will be described in more detail later.

Figure 19:
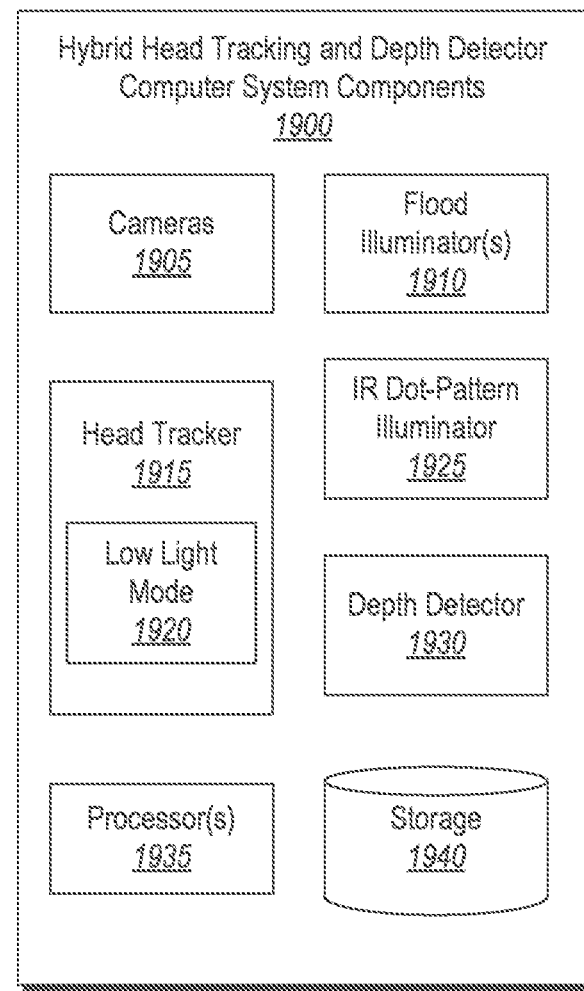
FIG. 19 shows a hybrid of head tracking (i.e., movement detection) and depth detector computer system components.

With that said, attention will now be directed to FIG. 19 which illustrates hybrid head (and also hand) tracking and depth detector computer system components 1900. In particular, these components include cameras 1905, flood illuminator(s) 1910, a head tracker 1915, which may include at least a low light mode 1920, an IR dot-pattern illuminator 1925, and a depth detector 1930. The components also include one or more processors 1935 and storage 1940. The one or more processors 1935 may be specially configured as the head tracker 1915 and the depth detector 1930 and to executed stored computer-executable instructions stored in the storage for implementing the disclosed methods.

Figure 20:
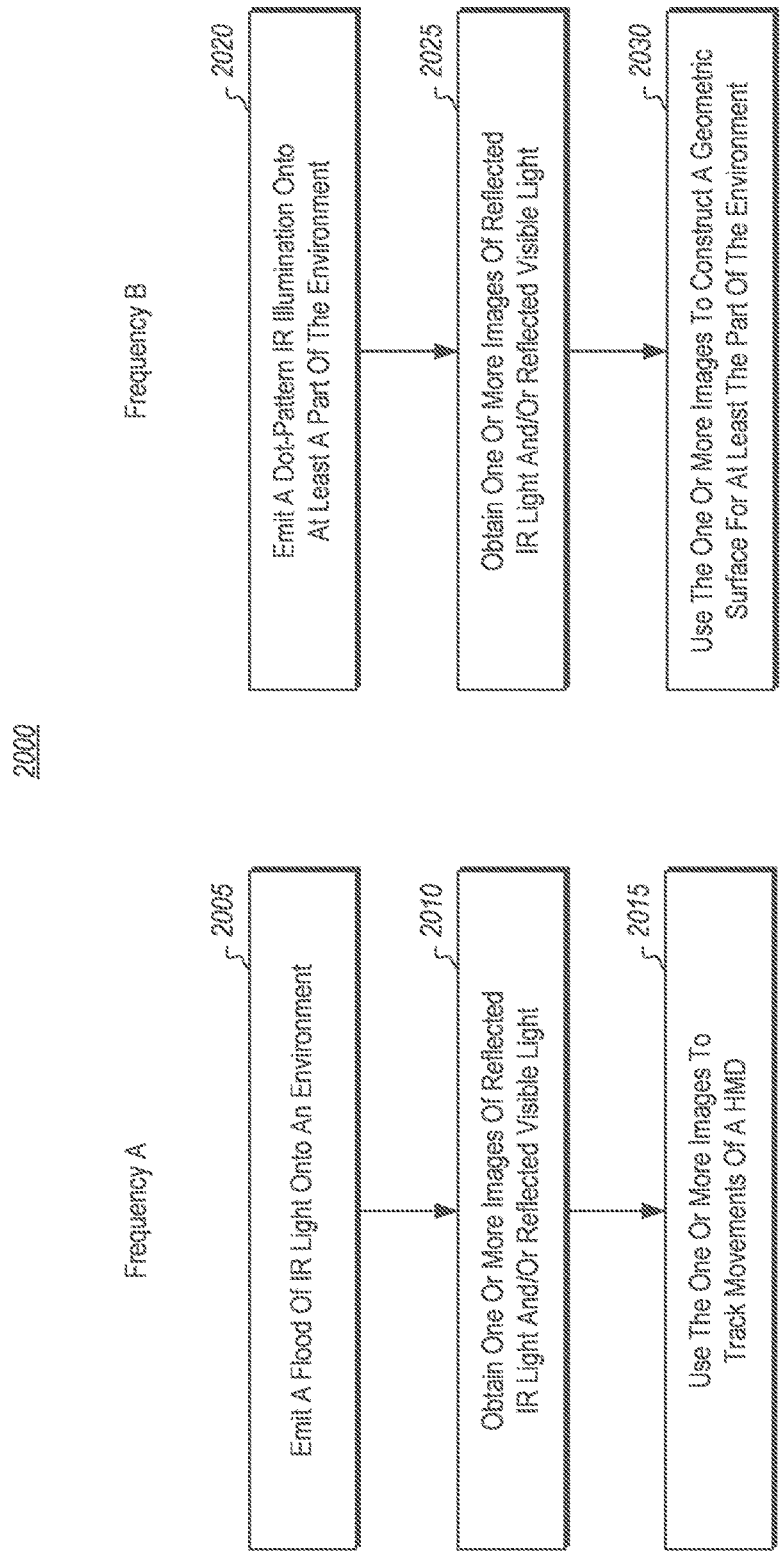
FIG. 20 provides an example method for performing movement detection in a low light environment in conjunction with depth detection.

Attention will now be directed to FIG. 20 which illustrates a flowchart 2000 of various acts associated with performing camera-based tracking of movements of a head-mounted device (HMD) in a low light environment in conjunction with determining object depth. These acts are performed by an HMD that includes the hybrid head tracking and depth detector computer system components 1900 from FIG. 19, for example.

As shown, the illustrated acts are separated into two columns. This format demonstrates that at least some of the acts are not temporally dependent on all other acts. This format is similar to the format discussed in connection with FIG. 12.

Focusing first on the left column (i.e., the column labeled "Frequency A"), a number of acts are performed at a first selected frequency (e.g., the frequencies suitable for performing tracking). The first act is an act for emitting flood IR light with a flood IR light illuminator (act 2005). This act may be performed by the flood illuminators 1910 from FIG. 19, for example.

With regard to the act of emitting the flood of IR light, it will be appreciated that the IR light can be emitted at different intensities, depending on the mode of operation, as discussed earlier. For instance, the intensity of flood IR light (or even the IR dot-pattern light) may be dynamically adjusted to accommodate head tracking scenarios and hand tracking scenarios. For instance, because hands are often quite close to the HMD, the HMD will reduce the intensity level of the IR light when performing hand tracking. In contrast, when it is determined the system is performing head tracking, the HMD will increase the intensity level of the IR light to more effectively illuminate objects in the surrounding environment (further than the user's hand).

Next, the head tracking stereo camera pair obtains one or more images of reflected IR light and/or reflected visible light (act 2010). Then, once the images are obtained, they are used to track the movements of the HMD (act 2015), such as by detecting the relative position/orientation of detected objects relative to detected anchor points (as described above). Notably, these operations may be performed by the head tracking cameras of a HMD even when the HMD is operating in a low light environment, by utilizing the IR light reflections.

Focusing now on the right column (i.e., the column labeled "Frequency B"), there are a number of method acts that may be performed at a different frequency than Frequency A. At this point, it is worthwhile to note that although the method acts are shown as occurring at a set/particular frequency, the method acts may also be performed at variable frequencies (asynchronously triggered) in response to various detectable conditions. For example, if the HMD determines that the low light environment includes objects having low or no texture, then the HMD may asynchronously trigger its IR dot-pattern light illuminator to emit the dot-pattern illumination. Regardless of whether the acts are triggered asynchronously or at a fixed period in accordance with an established frequency, the HMD is able to cause its IR dot-pattern illuminator to emit an IR dot-pattern illumination onto at least a part of the low light environment (act 2020). This act may be performed by the IR dot-pattern illuminator 1925, for example.

As further illustrated, the head tracking stereo camera pair obtain one or more images that include digital content corresponding to the reflected IR dot-pattern light and/or the reflected visible light (act 2025).

Finally, the one or more images of the reflected IR dot-pattern light are used to construct depth map and one or more geometric surfaces in the surrounding environment (act 2030). As one example, the geometric surface may be for the user's hand while in another example the geometric surface may be for a textureless/smooth table. This may be performed, for example, by the depth detector 1930.

In some embodiments, additional acts are performed at yet another frequency. For example, the HMD may also obtain images used to monitor the user's hand movements. Initially, the HMD passively performs these operations at a low frequency (e.g., 3 frames per second) until such time as a hand is eventually identified within an image. When the user's hand is finally detected in an image, then the HMD dynamically changes the IR light illuminator and/or camera processes to be performed at a higher frequency (e.g., anywhere between 30 frames per second to 60 frames per second). By dynamically increasing the operational frequencies in this manner, the HMD is able to better adjust for and track the movements of a user's hand during use of an HMD.

Notably, the hand-tracking images are often obtained using the head tracking cameras and the flood IR light illuminators. Consequently, the flood IR illuminators may be multi-purposed to perform both head tracking and hand tracking. To determine whether a hand is present in an image, the HMD has been configured/trained (e.g., through machine learning) to detect hands and to perform hand segmentation on the images that were captured using the flood of IR light. In alternative situations, the HMD may use the depth map that was generated using the IR dot-pattern illuminators to perform object segmentation and/or object matching.

In some embodiments, the HMD actively tracks the user's hand at the higher/modified frequency until the user's hand is no longer detectable in the images. Once the hand is no longer detectable, then the HMD may return to the lower frequency (e.g., 3 frames per second).

It will be appreciated from this disclosure, the HMD systems described herein may be used to perform a number of different tracking and depth detection operations at different operational frequencies. For example, at one frequency, the HMD may perform head tracking. At a different frequency, the HMD may perform hand tracking. At yet another frequency, the HMD may perform depth detection. Of course, these frequencies are dynamically adjustable, based on detected environmental conditions and/or modes of operation. Furthermore, the HMD is able to dynamically adjust the intensity of IR light emitted by the flood IR light illuminators and/or the IR dot-pattern illuminators to account for these different modes of operation.

It will also be appreciated that the HMD may support any number of cameras. For instance, to perform head and/or hand tracking, the HMD may use/include only a single camera (i.e., mono camera implementation). Alternatively, as discussed earlier, the HMD may include any number of cameras (one, or more than one).

In some embodiments, there are multiple sets of stereo camera pairs. In some embodiments, depth may also be obtained using a single camera. For instance, depth can be measured from parallax that occurs when a single camera moves. Such computations provide a relative depth as opposed to an absolution depth. It is possible, for instance, to determine that the depth of a pixel is smaller than the depth of another pixel, and to thereby provide the relative depth determination. Higher degrees/amounts of parallax might be observed because the camera undergoes a large motion and the point has large depth. Alternatively, higher degrees/amounts of parallax might be observed if the point has small depth and there was only a small motion. Because of this ambiguity, the results are accurate up to a scale factor and hence the HMD obtains a different output compared to the stereo approach for determining depth.

Example Computer System

Figure 21:
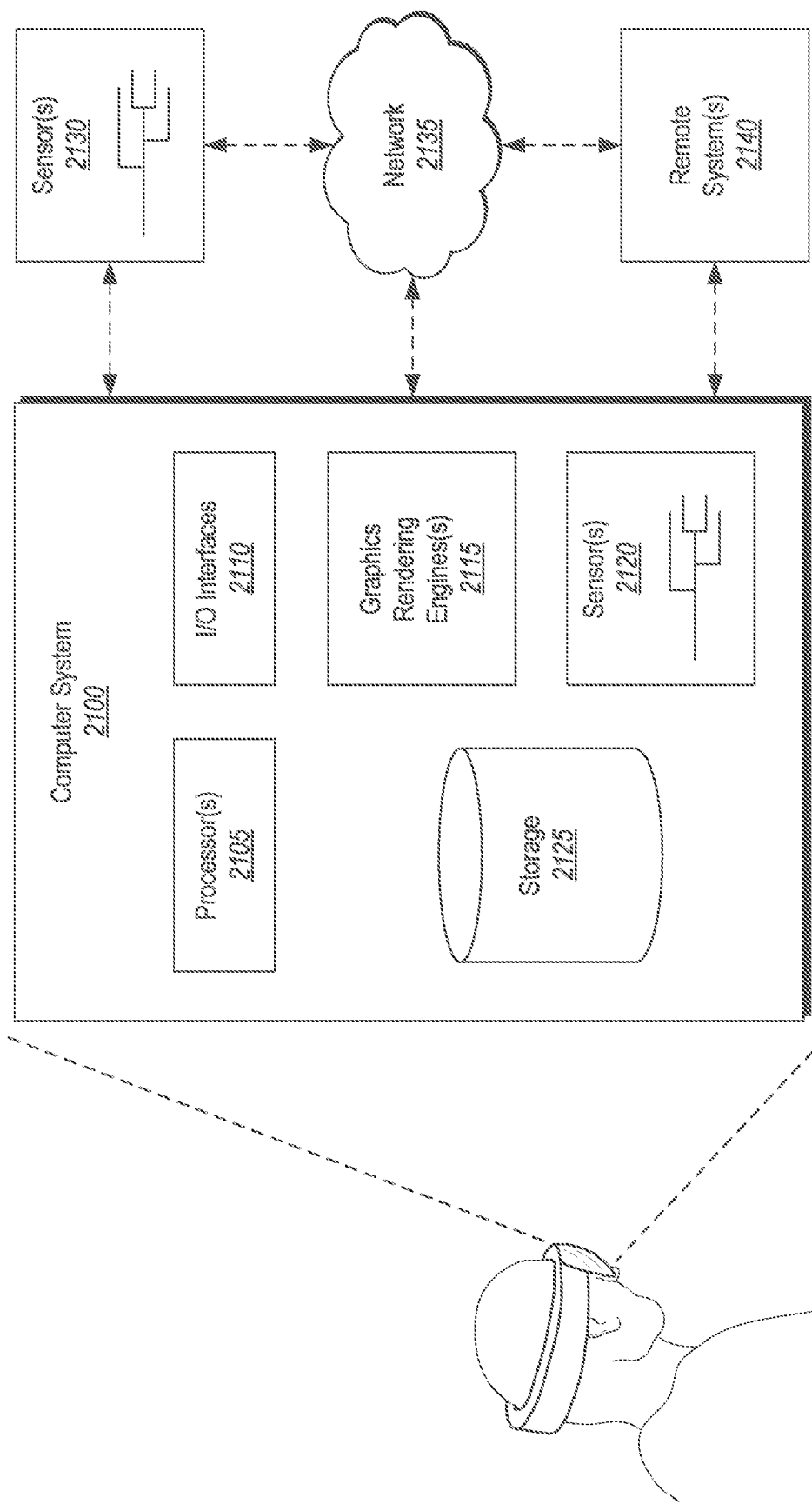
FIG. 21 illustrates an example computer system that may be used to perform embodiments disclosed herein.

Having just described the various features and functionalities of some of the disclosed embodiments, the focus will now be directed to FIG. 21 which illustrates an example computer system 2100 that may be used to facilitate the operations described herein. In particular, this computer system 2100 may be in the form of the HMDs that were described earlier.

In fact, the computer system 2100 may take various different forms. For example, in FIG. 21, the computer system 2100 is embodied as an HMD. Although the computer system 2100 may be embodied as an HMD, the computer system 2100 may also be a distributed system that includes one or more connected computing components/devices that are in communication with the HMD. Accordingly, the computer system 2100 may be embodied in any form and is not limited strictly to the depiction illustrated in FIG. 21. By way of example, the computer system 2100 may include a desktop computer, a laptop, a tablet, a mobile phone, server, data center and/or any other computer system.

In its most basic configuration, the computer system 2100 includes various different components. For example, FIG. 21 shows that computer system 2100 includes at least one hardware processing unit 2105 (aka a "processor"), input/output (I/O) interfaces 2110, graphics rendering engines 2115, one or more sensors 2120, and storage 2125. Regarding the hardware processing unit 2105, this may be an example implementation of the processors 1025 from FIG. 10, the processors 1530 from FIG. 15, and the processors 1935 from FIG. 19. More detail on the hardware processing unit 2105 will be presented momentarily.

The storage 2125 may be physical system memory, which may be volatile, non-volatile, or some combination of the two. The term "memory" may also be used herein to refer to non-volatile mass storage such as physical storage media. If the computer system 2100 is distributed, the processing, memory, and/or storage capability may be distributed as well. As used herein, the term "executable module," "executable component," or even "component" can refer to software objects, routines, or methods that may be executed on the computer system 2100. The different components, modules, engines, and services described herein may be implemented as objects or processors that execute on the computer system 2100 (e.g., as separate threads).

The disclosed embodiments may comprise or utilize a special-purpose or general-purpose computer including computer hardware, such as, for example, one or more processors (such the hardware processing unit 2105) and system memory (such as storage 2125), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 2100 may also be connected (via a wired or wireless connection) to external sensors 2130 (e.g., one or more remote cameras, accelerometers, gyroscopes, acoustic sensors, magnetometers, etc.). Further, the computer system 2100 may also be connected through one or more wired or wireless networks 2135 to remote systems(s) 2140 that are configured to perform any of the processing described with regard to computer system 2100.

During use, a user of the computer system 2100 is able to perceive information (e.g., a mixed-reality environment) through a display screen that is included among the I/O interface(s) 2110 and that is visible to the user. The I/O interface(s) 2110 and sensors 2120/2130 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 2115 is configured, with the hardware processing unit 2105, to render one or more virtual objects within the scene. As a result, the virtual objects accurately move in response to a movement of the user and/or in response to user input as the user interacts within the virtual scene.

A "network," like the network 2135 shown in FIG. 21, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 2100 will include one or more communication channels that are used to communicate with the network 2135. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 2105). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The disclosed embodiments provide various advantages over traditional HMD systems. Some of these advantages include providing a more robust and accurate depth determination for mixed-reality environments, particularly low light environments. Additionally, some of these advantages include the ability to track movement (e.g., head movement, hand movement, etc.) in any kind of environment, even low light environments. Furthermore, by repurposing existing hardware components, such as the head tracking cameras to additionally perform depth detection, the disclosed embodiments can reduce/simplify the costs, power consumption and form factor of the HMD systems.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A head-mounted device (HMD) configured for performing head tracking and depth detection, the HMD comprising:
   a stereo camera pair comprising a first camera and a second camera which are both mounted on the HMD, wherein:
      an overlapping field of view region is created as a result of at least a part of a field of view of the first camera overlapping at least a part of a field of view of the second camera, and
      both the first camera and the second camera are configured to detect both visible light and infrared (IR) light;
   an IR dot-pattern illuminator configured to emit an IR dot-pattern illumination that spans an illumination area, wherein:
      the IR dot-pattern illuminator is mounted on the HMD, and
      at least a part of the illumination area overlaps at least a part of the overlapping field of view region such that both the first camera and the second camera detect at least a same part of the IR dot-pattern illumination;
   one or more processors; and
   one or more computer-readable hardware storage devices that store instructions that are executable by the one or more processors to cause the HMD to:
      generate a first image using the first camera and generate a second image using the second camera;
      generate a depth map based on the first image and the second image; and
      adjust the depth map to account for a jitter phenomenon that potentially occurs when neighboring depth pixels in the depth map have different depth values, wherein adjusting the depth map includes:
         identifying a set of neighboring depth pixels in the depth map, wherein the neighboring depth pixels in the set are identified as a result of one or more differences in depth values of the neighboring depth pixels exceeding a predefined threshold; and
         filtering the depth map to initially remove at least one of the neighboring depth pixels in the set.

2. The HMD of claim 1, wherein the IR dot-pattern illuminator is positioned between the first camera and the second camera.

3. The HMD of claim 1, wherein the IR dot-pattern illuminator is positioned closer to the first camera than to the second camera.

4. The HMD of claim 1, wherein a distance between the first camera and the second camera on the HMD constitutes a baseline, and wherein the baseline is at least 4 centimeters.

5. The HMD of claim 1, wherein the illumination area overlaps at least 30% of the overlapping field of view region.

6. The HMD of claim 1, wherein the instructions are further executable by the one or more processors to cause the HMD to:
   use the first camera and the second camera to detect an amount of visible light and reflected IR light generated as a result of the IR dot-pattern illuminator emitting the IR dot-pattern illumination; and
   in response to a detected intensity of the reflected IR light and detected visible light, modify a power level of the IR dot-pattern illuminator until a threshold intensity is detected by the first camera and the second camera.

7. The HMD of claim 1, wherein at least one of the first camera and the second camera includes a bandpass filter that allows at least some visible light to pass through the bandpass filter and at least some IR light to pass through the bandpass filter and that filters out at least some visible light.

8. A computer system configured for performing head tracking and depth detection, the computer system comprising:
   a stereo camera pair comprising a first camera and a second camera which are both mounted on the computer system, wherein:
      an overlapping field of view region is created as a result of at least a part of a field of view of the first camera overlapping at least a part of a field of view of the second camera, and both the first camera and the second camera are configured to detect both visible light and infrared (IR) light;
an IR dot-pattern illuminator configured to emit an IR dot-pattern illumination that spans an illumination area, wherein:
the IR dot-pattern illuminator is mounted on the computer system, and
at least a part of the illumination area overlaps at least a part of the overlapping field of view region such that both the first camera and the second camera detect at least a same part of the IR dot-pattern illumination;
one or more processors; and
one or more computer-readable hardware storage devices that store instructions that are executable by the one or more processors to cause the HMD to:
generate a first image using the first camera and generate a second image using the second camera;
generate a depth map based on the first image and the second image; and
adjust the depth map to account for a jitter phenomenon that potentially occurs when neighboring depth pixels in the depth map have different depth values, wherein adjusting the depth map includes:
identifying a set of neighboring depth pixels in the depth map, wherein the neighboring depth pixels in the set are identified as a result of one or more differences in depth values of the neighboring depth pixels exceeding a predefined threshold; and
filtering the depth map to initially remove at least one of the neighboring depth pixels in the set.

9. The computer system of claim 8, wherein the first camera and the second camera are global shutter cameras.

10. The computer system of claim 8, wherein the IR dot-pattern illuminator is positioned between the first camera and the second camera.

11. The computer system of claim 8, wherein the first camera and the second camera also capture one or more images to track movements of the computer system.

12. The computer system of claim 8, wherein the IR dot-pattern illuminator pulses the IR dot-pattern illumination, wherein pulsing the IR dot-pattern illumination is synchronized with an exposure time of the first camera and the second camera.

13. The computer system of claim 12, wherein the IR dot-pattern illuminator pulses the IR dot-pattern illumination at a rate between or including 0.5 frames per second and 30 frames per second.

14. The computer system of claim 8, wherein the computer system is a virtual-reality head mounted device (HMD) or an augmented-reality HMD.

15. The computer system of claim 8, wherein the IR dot-pattern illuminator is positioned closer to the first camera than to the second camera.

16. A computer system configured to perform head tracking and depth detection, the computer system comprising:
a first camera and a second camera that are both mounted on the computer system, wherein an overlapping field of view region is created as a result of at least a part of a field of view of the first camera overlapping at least a part of a field of view of the second camera;
an infrared (IR) dot-pattern illuminator configured to emit an IR dot-pattern illumination that spans an illumination area, wherein at least a part of the illumination area overlaps at least a part of the overlapping field of view region such that both the first camera and the second camera detect at least a same part of the IR dot-pattern illumination;
one or more processors; and
one or more computer-readable hardware storage devices that store instructions that are executable by the one or more processors to cause the HMD to:
generate a first image using the first camera and generate a second image using the second camera;
generate a depth map based on the first image and the second image; and
adjust the depth map to account for a jitter phenomenon that potentially occurs when neighboring depth pixels in the depth map have different depth values, wherein adjusting the depth map includes:
identifying a set of neighboring depth pixels in the depth map, wherein the neighboring depth pixels in the set are identified as a result of one or more differences in depth values of the neighboring depth pixels exceeding a predefined threshold; and
filtering the depth map to initially remove at least one of the neighboring depth pixels in the set.

17. The computer system of claim 16, wherein the IR dot-pattern illuminator is mounted on the computer system.

18. The computer system of claim 16, wherein the IR dot-pattern illumination provides supplemental texture to existing texture of objects that are being illuminated by the IR dot-pattern illuminator.

19. The computer system of claim 16, wherein the illumination area overlaps a majority of the overlapping field of view.

* * * * *